US012515769B2

(12) United States Patent
Garner et al.

(10) Patent No.: US 12,515,769 B2
(45) Date of Patent: *Jan. 6, 2026

(54) WATER SAFETY GARMENT, RELATED APPARATUS AND METHODS

(71) Applicant: Boost Ideas, LLC, Miami, FL (US)

(72) Inventors: Robert Garner, Miami, FL (US); Paul Metcalfe, Solon, OH (US); Scott Urban, Solon, OH (US)

(73) Assignee: Boost Ideas, LLC, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/648,867

(22) Filed: Apr. 29, 2024

(65) Prior Publication Data

US 2024/0286722 A1   Aug. 29, 2024

Related U.S. Application Data

(63) Continuation of application No. 17/476,531, filed on Sep. 16, 2021, now Pat. No. 11,999,455, which is a
(Continued)

(51) Int. Cl.
*B63C 9/125* (2006.01)
*B63C 9/00* (2006.01)
(Continued)

(52) U.S. Cl.
CPC ............ *B63C 9/1255* (2013.01); *B63C 9/081* (2013.01); *B63C 9/125* (2013.01); *B63C 9/18* (2013.01);
(Continued)

(58) Field of Classification Search
CPC .......... B63C 9/0005; B63C 2009/0017; B63C 2009/0029; B63C 2009/0041;
(Continued)

(56) References Cited

U.S. PATENT DOCUMENTS

| 2,607,934 A | 8/1952 | Bailhe |
| 2,904,217 A | 9/1959 | Gurney |

(Continued)

FOREIGN PATENT DOCUMENTS

| DE | 102017115297 A1 | 1/2019 |
| EP | 1961654 A1 | 8/2008 |

(Continued)

OTHER PUBLICATIONS

International Search Report for PCT/US2020/016705 dated Jun. 2, 2020.
(Continued)

*Primary Examiner* — Ajay Vasudeva
(74) *Attorney, Agent, or Firm* — Buchanan Ingersoll & Rooney PC

(57) ABSTRACT

A water safety garment and apparatus configured to avoid drowning can be configured to permit submergence for a predetermined period of time without inflation. After the predetermined time has passed, the garment or other apparatus can be configured to inflate to help a person wearing the garment float on top of the water to avoid drowning or other potentially harmful condition that may result from being underwater for too long. In some embodiments, a circuit may be utilized to detect the submergence condition of a person wearing the apparatus or garment. Upon a determination that the detected submergence condition has occurred continuously for a pre-determined period of time, an inflation mechanism can be actuated to force the person wearing the apparatus or garment to float to the top of the water.

18 Claims, 24 Drawing Sheets

Related U.S. Application Data continuation of application No. 16/782,121, filed on Feb. 5, 2020, now Pat. No. 11,155,325.

(60) Provisional application No. 62/801,988, filed on Feb. 6, 2019.

(51) Int. Cl.
  *B63C 9/08* (2006.01)
  *B63C 9/18* (2006.01)
  *B63C 9/20* (2006.01)

(52) U.S. Cl.
  CPC ........ *B63C 9/20* (2013.01); *B63C 2009/0047* (2013.01)

(58) Field of Classification Search
  CPC .... B63C 2009/0047; B63C 2009/0052; B63C 9/081; B63C 9/087; B63C 9/105; B63C 9/1055; B63C 9/11; B63C 9/125; B63C 9/1255; B63C 9/15; B63C 9/155; B63C 9/18; B63C 9/19; B63C 9/20
  See application file for complete search history.

(56) References Cited

U.S. PATENT DOCUMENTS

| | | |
|---|---|---|
| 2,944,268 A | 7/1960 | Fruendt |
| 2,946,484 A | 7/1960 | Stoner |
| 3,004,269 A | 10/1961 | Dillier |
| 3,059,814 A | 10/1962 | Poncel et al. |
| 3,077,288 A | 2/1963 | Henry |
| 3,080,582 A | 3/1963 | Reffell |
| 3,130,424 A | 4/1964 | Santangelo |
| 3,143,751 A | 8/1964 | Davis |
| 3,147,499 A | 9/1964 | Nelson et al. |
| 3,198,020 A | 8/1965 | Raffell et al. |
| 3,199,128 A | 8/1965 | Nojd |
| 3,237,806 A | 3/1966 | Nelson et al. |
| 3,354,480 A | 11/1967 | Harding et al. |
| 3,355,751 A | 12/1967 | McGroarty |
| 3,370,784 A | 2/1968 | Day |
| 3,426,942 A | 2/1969 | McMains et al. |
| 3,441,963 A | 5/1969 | Steinthal |
| 3,449,777 A | 6/1969 | Hattori |
| 3,510,025 A | 5/1970 | Turner, Jr. |
| 3,597,780 A | 8/1971 | Coyle |
| 3,602,661 A | 8/1971 | Liedberg |
| 3,757,371 A | 9/1973 | Martin |
| 3,802,012 A | 4/1974 | Middleton, Jr. |
| 3,815,783 A | 6/1974 | Hirata |
| 3,817,263 A | 6/1974 | Bendler et al. |
| 3,952,350 A | 4/1976 | Moucka |
| 4,024,440 A | 5/1977 | Miller |
| 4,161,797 A | 7/1979 | Ruscigno |
| 4,191,310 A | 3/1980 | Bernhardt et al. |
| 4,223,805 A | 9/1980 | Mackal |
| 4,232,417 A | 11/1980 | Miller et al. |
| 4,246,672 A | 1/1981 | Fujiyama et al. |
| 4,260,075 A | 4/1981 | Mackal |
| 4,267,944 A | 5/1981 | Mackal |
| 4,276,669 A | 7/1981 | Suba |
| 4,324,507 A | 4/1982 | Harrah |
| 4,356,936 A | 11/1982 | Legris |
| 4,457,730 A | 7/1984 | Foster et al. |
| 4,475,664 A | 10/1984 | Mackal |
| 4,482,333 A | 11/1984 | Geri et al. |
| 4,489,855 A | 12/1984 | Boetger |
| 4,493,664 A | 1/1985 | Dale |
| 4,498,604 A | 2/1985 | Mackal |
| 4,498,605 A | 2/1985 | Mackal et al. |
| 4,500,014 A | 2/1985 | Zimmerly |
| 4,524,885 A | 6/1985 | Zimmerly |
| 4,563,156 A | 1/1986 | Bissig |
| 4,582,494 A | 4/1986 | Becnel |
| 4,627,823 A | 12/1986 | Mackal |
| 4,714,914 A | 12/1987 | Boe |
| 4,927,057 A | 5/1990 | Janko et al. |
| 4,946,067 A | 8/1990 | Kelsall |
| 4,968,277 A | 11/1990 | Parish et al. |
| 4,972,971 A | 11/1990 | Janko et al. |
| 4,998,900 A | 3/1991 | Wright |
| 5,026,310 A | 6/1991 | Mackal et al. |
| 5,035,345 A | 7/1991 | Janko et al. |
| 5,067,921 A | 11/1991 | Bramham |
| 5,148,346 A | 9/1992 | Naab et al. |
| 5,311,394 A | 5/1994 | Naab et al. |
| 5,333,656 A | 8/1994 | Mackal |
| 5,333,756 A | 8/1994 | Glasa |
| 5,338,239 A | 8/1994 | Cleaveland |
| 5,370,567 A | 12/1994 | Glasa |
| 5,400,922 A | 3/1995 | Weinheimer et al. |
| 5,419,725 A | 5/1995 | Crowder et al. |
| 5,429,539 A | 7/1995 | Glasa |
| 5,466,179 A | 11/1995 | Jeffrey, Sr. |
| 5,488,946 A | 2/1996 | Calhoun et al. |
| 5,509,576 A | 4/1996 | Weinheimer et al. |
| 5,516,233 A | 5/1996 | Courtney |
| 5,560,738 A | 10/1996 | Noel |
| 5,562,233 A | 10/1996 | Glasa |
| 5,597,091 A | 1/1997 | Mah et al. |
| 5,597,335 A | 1/1997 | Woodland |
| 5,601,124 A | 2/1997 | Weinheimer et al. |
| 5,603,646 A | 2/1997 | Tobias |
| 5,605,482 A | 2/1997 | Choy |
| 5,643,030 A | 7/1997 | Brown |
| 5,653,191 A | 8/1997 | Calhoun et al. |
| 5,685,455 A | 11/1997 | Glasa |
| 5,694,986 A | 12/1997 | Weinheimer et al. |
| 5,746,633 A | 5/1998 | Jeffrey |
| 5,759,076 A | 6/1998 | Bateman et al. |
| 5,816,878 A | 10/1998 | McNamee |
| 5,839,933 A | 11/1998 | Davis, Sr. et al. |
| 5,852,986 A | 12/1998 | Mackal |
| 5,855,454 A | 1/1999 | Courtney et al. |
| 5,921,835 A | 7/1999 | Gordon et al. |
| 6,024,116 A | 2/2000 | Almberg et al. |
| 6,062,143 A | 5/2000 | Grace et al. |
| 6,065,421 A | 5/2000 | Haller et al. |
| 6,077,138 A | 6/2000 | Schulze |
| 6,120,337 A | 9/2000 | Bautista Real et al. |
| 6,155,899 A | 12/2000 | Boddy |
| 6,168,487 B1 | 1/2001 | Nissen |
| 6,203,246 B1 | 3/2001 | Courtney et al. |
| 6,223,678 B1 | 5/2001 | Haller et al. |
| 6,227,925 B1 | 5/2001 | Boddy |
| 6,254,447 B1 | 7/2001 | Niemann |
| 6,260,199 B1 | 7/2001 | Grunstein et al. |
| 6,270,386 B1 | 8/2001 | Visocckas |
| 6,422,420 B1 | 7/2002 | Brown |
| 6,431,108 B1 | 8/2002 | Lopez-Perea Lloveres et al. |
| 6,435,371 B1 | 8/2002 | Perrins |
| 6,494,756 B2 | 12/2002 | Michaud et al. |
| 6,527,479 B1 | 3/2003 | Courtney et al. |
| 6,530,725 B1 | 3/2003 | Courtney et al. |
| 6,546,561 B2 | 4/2003 | Duhamell |
| 6,550,415 B2 | 4/2003 | Lloveres et al. |
| 6,554,669 B1 | 4/2003 | Motosko |
| 6,558,082 B1 | 5/2003 | Courtney et al. |
| 6,561,863 B1 | 5/2003 | Campbell |
| 6,589,087 B2 | 7/2003 | Mackal et al. |
| 6,659,689 B1 | 12/2003 | Courtney et al. |
| 6,666,622 B1 | 12/2003 | Courtney et al. |
| 6,766,535 B2 | 7/2004 | Duhamell et al. |
| 6,769,714 B2 | 8/2004 | Hosey et al. |
| 6,798,346 B2 | 9/2004 | Kim |
| 6,805,519 B1 | 10/2004 | Courtney |
| 6,843,694 B2 | 1/2005 | Simmons |
| 6,874,814 B2 | 4/2005 | Hosey et al. |
| 6,951,493 B1 | 10/2005 | Lu |
| 6,976,894 B1 | 12/2005 | Turner |
| 7,004,807 B1 | 2/2006 | Summers |
| 7,033,237 B2 | 4/2006 | Spagnuolo |
| 7,053,822 B2 | 5/2006 | Rickerson, Jr. |

(56) References Cited

U.S. PATENT DOCUMENTS

| | | |
|---|---|---|
| 7,056,179 B2 | 6/2006 | Courtney |
| 7,059,924 B2 | 6/2006 | Farmer et al. |
| 7,059,925 B2 | 6/2006 | Smith et al. |
| 7,128,629 B2 | 10/2006 | Summers |
| 7,150,668 B2 | 12/2006 | Kemp |
| 7,185,600 B2 | 3/2007 | Toussi et al. |
| 7,186,158 B1 | 3/2007 | Barber et al. |
| 7,239,246 B2 | 7/2007 | Picco et al. |
| 7,267,365 B2 | 9/2007 | Quioc |
| 7,305,715 B2 | 12/2007 | Orsos |
| 7,351,126 B2 | 4/2008 | Turner |
| 7,357,689 B2 | 4/2008 | Campbell |
| 7,438,619 B2 | 10/2008 | Starver |
| 7,489,253 B2 | 2/2009 | Murphy |
| 7,544,111 B2 | 6/2009 | Isberg et al. |
| 7,572,161 B2 | 8/2009 | Mackal et al. |
| 7,669,616 B2 | 3/2010 | Bruengger |
| 7,699,679 B2 | 4/2010 | Lahyani |
| 7,714,730 B2 | 5/2010 | Ford et al. |
| 7,819,714 B2 | 10/2010 | Medford et al. |
| 7,854,347 B2 | 12/2010 | Wang |
| RE42,149 E | 2/2011 | Courtney et al. |
| 7,887,091 B1 | 2/2011 | Cox et al. |
| RE42,238 E | 3/2011 | Courtney et al. |
| 7,934,749 B2 | 5/2011 | Burns |
| 8,013,749 B2 | 9/2011 | Murphy |
| 8,033,755 B2 | 10/2011 | Stood et al. |
| 8,104,096 B1 | 1/2012 | Jenney |
| 8,113,897 B2 | 2/2012 | Hanson |
| 8,231,421 B1 | 7/2012 | Hubbard et al. |
| 8,353,736 B2 | 1/2013 | Wang |
| 8,360,276 B2 | 1/2013 | Rogier et al. |
| 8,569,641 B2 | 10/2013 | Ford |
| 8,613,637 B2 | 12/2013 | Puls et al. |
| 8,618,940 B2 | 12/2013 | Ford et al. |
| 8,643,497 B2 | 2/2014 | Murphy |
| 8,695,521 B2 | 4/2014 | Dondurur et al. |
| 8,721,379 B2 | 5/2014 | Becnel |
| 8,727,825 B2 | 5/2014 | Tsolkas |
| 8,777,684 B2 | 7/2014 | Grutta et al. |
| 8,807,177 B2 | 8/2014 | Strangis |
| 8,808,048 B2 | 8/2014 | Kent |
| 8,826,931 B2 | 9/2014 | Clark et al. |
| 8,851,948 B2 | 10/2014 | Grutta et al. |
| 8,851,949 B2 | 10/2014 | Grutta et al. |
| 8,920,205 B2 | 12/2014 | McCarthy |
| 8,970,382 B2 | 3/2015 | Bermudez Pestonit et al. |
| 9,004,116 B2 | 4/2015 | Walker et al. |
| 9,139,271 B2 | 9/2015 | Beach-Drummond |
| 9,150,292 B2 | 10/2015 | Ibsen et al. |
| 9,180,343 B2 | 11/2015 | Yeo |
| 9,289,633 B2 | 3/2016 | Walker et al. |
| 9,290,144 B1 | 3/2016 | Cox et al. |
| 9,328,834 B2 | 5/2016 | Wang |
| 9,340,266 B2 | 5/2016 | Kent |
| 9,365,270 B2 | 6/2016 | Lee |
| 9,440,133 B2 | 9/2016 | Davis et al. |
| 9,469,388 B2 | 10/2016 | Olshan |
| 9,475,557 B2 | 10/2016 | Maechler |
| 9,492,711 B2 | 11/2016 | Walker et al. |
| 9,688,370 B1 | 6/2017 | Shiue |
| 9,789,940 B2 | 10/2017 | Betz et al. |
| 9,802,685 B2 | 10/2017 | Kent |
| 9,868,495 B2 | 1/2018 | Schechter |
| 11,155,325 B2 | 10/2021 | Garner et al. |
| 11,999,455 B2 * | 6/2024 | Garner .................... B63C 9/125 |
| 2002/0009335 A1 | 1/2002 | Courtney et al. |
| 2002/0166494 A1 | 11/2002 | Inglis |
| 2003/0194277 A1 | 10/2003 | Courtney |
| 2004/0033739 A1 | 2/2004 | Courtney |
| 2004/0120774 A1 | 6/2004 | Courtney et al. |
| 2004/0157514 A1 | 8/2004 | Courtney |
| 2004/0258481 A1 | 12/2004 | Courtney et al. |
| 2005/0042956 A1 | 2/2005 | Hodara |
| 2005/0242966 A1 | 11/2005 | Picco et al. |
| 2005/0245149 A1 | 11/2005 | Medford et al. |
| 2005/0255724 A1 | 11/2005 | Picco et al. |
| 2006/0012483 A1 | 1/2006 | Ethington |
| 2006/0125647 A1 | 6/2006 | Oakes et al. |
| 2006/0160444 A1 | 7/2006 | Campbell |
| 2007/0155264 A1 | 7/2007 | Barber et al. |
| 2007/0243021 A1 | 10/2007 | Tyler |
| 2009/0004938 A1 | 1/2009 | Staver et al. |
| 2009/0036009 A1 | 2/2009 | Carl |
| 2009/0280705 A1 | 11/2009 | Puls et al. |
| 2010/0248567 A1 | 9/2010 | Carl |
| 2011/0009020 A1 | 1/2011 | Withers et al. |
| 2011/0097952 A1 | 4/2011 | Pirie |
| 2011/0165805 A1 | 7/2011 | Berry |
| 2011/0181030 A1 | 7/2011 | Burns |
| 2011/0221174 A1 | 9/2011 | Cox et al. |
| 2012/0128425 A1 | 5/2012 | Walck |
| 2012/0312215 A1 | 12/2012 | Lyons |
| 2012/0324839 A1 | 12/2012 | Strangis |
| 2012/0325365 A1 | 12/2012 | Strangis |
| 2013/0109260 A1 | 5/2013 | Low |
| 2013/0171894 A1 | 7/2013 | Ashard |
| 2013/0210297 A1 | 8/2013 | Maas et al. |
| 2013/0327890 A1 | 12/2013 | Lyons |
| 2015/0147925 A1 | 5/2015 | Klare |
| 2015/0166155 A1 | 6/2015 | Tseng |
| 2015/0284063 A1 | 10/2015 | Baron |
| 2015/0314843 A1 | 11/2015 | Ashard et al. |
| 2015/0345910 A1 | 12/2015 | Searle et al. |
| 2015/0360759 A1 | 12/2015 | Ashard |
| 2016/0096600 A1 | 4/2016 | Zhang |
| 2016/0258547 A1 | 9/2016 | Harlow et al. |
| 2016/0280342 A1 | 9/2016 | Fawcett, Jr. |
| 2016/0375970 A1 | 12/2016 | Johnston |
| 2017/0029081 A1 | 2/2017 | Michalski |
| 2017/0050708 A1 | 2/2017 | Lee |
| 2017/0167151 A1 | 6/2017 | Segal |
| 2017/0267322 A1 | 9/2017 | Betz et al. |
| 2017/0313395 A1 | 11/2017 | Yuan et al. |
| 2017/0341610 A1 | 11/2017 | Tu |
| 2018/0057126 A1 | 3/2018 | Chen et al. |

FOREIGN PATENT DOCUMENTS

| | | |
|---|---|---|
| JP | S56145870 A | 11/1981 |
| JP | H02241890 A | 9/1990 |
| WO | 2010036207 A1 | 4/2010 |
| WO | 2016148644 A1 | 9/2016 |

OTHER PUBLICATIONS

Written Opinion of the International Search Authority or PCT/US2020/016705 dated Jun. 2, 2020.

* cited by examiner

WATER SAFETY GARMENT, RELATED APPARATUS AND METHODS

CROSS-REFERENCE TO RELATED APPLICATIONS

The present application is a continuation application of U.S. patent application Ser. No. 17/476,531, which is a continuation application of U.S. patent application Ser. No. 16/782,121 (now issued as U.S. Pat. No. 11,155,325), which claims priority to U.S. Provisional Patent Application No. 62/801,988, which was filed on Feb. 6, 2019.

FIELD OF THE INVENTION

The present invention relates to safety equipment for water safety equipment, and more particularly, to automatically inflatable floatation devices.

BACKGROUND OF THE INVENTION

To mitigate the risk of drowning in various situations, it is known to equip individuals with automatically inflatable floatation devices. As one example, U.S. Pat. No. 9,139,271 to Beach-Drummond highlights the elevated drowning risks for children, weak swimmers and non-swimmers around swimming pools and other bodies of water. To address this, a personal floatation device is supplied with a water-activated inflator. The Beach-Drummond device is designed to resist inadvertent inflation from splashing, rain and generally wet environments.

While floatation devices like this one are helpful, they are less useful- or even detrimental—to wearers that can swim or that can otherwise safely completely or partially submerge themselves during a water-based activity. For instance, a sufficiently experienced wearer practicing holding his or her breath for brief periods in a shallow pool would be prevented from doing so by such a device due to unwanted inflation.

SUMMARY OF THE INVENTION

Embodiments of a water safety garment, embodiments of a related apparatus and embodiments of methods for making and utilizing the apparatus and/or the water safety garment, are provided herein. Embodiments of the water safety garment and apparatus can be configured to permit submergence of a garment for a predetermined period of time without inflation. After the predetermined time has passed, the garment or other apparatus can be configured to inflate to help a person wearing the garment float on top of the water to avoid drowning or other potentially harmful condition that may result from being underwater for too long.

In some embodiments, a water safety garment can include a garment body including at least one inflatable chamber, an inflation mechanism and an activation mechanism. The inflation mechanism can be connected to, and operable to inflate, the at least one inflatable chamber after the activation mechanism remains submerged for a predetermined time period. In some embodiments, the activation mechanism can be configured to actuate inflation of a garment via a control device so that a person wearing the garment is unable to stay submerged underwater.

In some embodiments, the activation mechanism can include two spaced apart electrical contacts arranged inside a detection chamber configured to facilitate detection of a submergence condition and/or detection of a person no longer being submerged. The spaced apart electric contacts within the chamber can be configured so that they are resulting in a normally open circuit that is subsequently completed when water is sufficiently filled within the chamber. In other embodiments, there may only be a single electrical contact or more than two electrical contacts.

The detection chamber can have one or more openings defined in an outer wall thereof allowing water to freely enter and exit when the detection chamber is placed in and removed from water. When the detection chamber is sufficiently flooded to close the circuit between the electrical contacts, a timer of the inflation mechanism can be activated. If the circuit remains closed for a predetermined time, a trigger of the inflation mechanism can initiate the automatic inflation of the at least one detection chamber. If the detection chamber drains sufficiently before the predetermined time is reached, the circuit can be opened due to the sufficient drainage of the water. The opening of the circuit can be configured to reset the timer or otherwise stop the timer to prevent the triggering of the inflation mechanism.

In some embodiments, a water garment can include a body, at least one inflatable chamber attached to the body; at least one inflation mechanism connected to the at least one inflatable chamber for inflation of the at least one inflatable chamber, at least one sensor element positioned to detect at least a part of a head of a user wearing the body being submerged under water, and a control device connected to the at least one sensor element and the inflation mechanism such that submergence of the at least the part of the head of the user wearing the body continuously for a pre-selected period of time is detectable. The control device can be configured to actuate the inflation mechanism to inflate the at least one inflatable chamber in response to determining that the submergence of the at least the part of the head of the user occurred continuously for the pre-selected period of time.

In some embodiments, the inflation mechanism comprises a gas source connected to a trigger. The trigger can be connected to the control device. In some embodiments, the trigger can include a resistor or motor that is actuated via a signal from the control device.

The at least one sensor element can be configured as a single element or can include multiple elements. For instance, the at least one sensor element can include only a first sensor element or can include at least a first sensor element and a second sensor element.

In some embodiments, the water garment can include a housing attached to a neck of the body of the garment. The housing can have a first chamber that extends vertically and a second chamber that extends vertically. A first sensor element can be positioned at least partially within the first chamber to detect a presence of liquid water within the first chamber and a second sensor element can be positioned at least partially within the second chamber to detect a presence of liquid water within the second chamber. In some embodiments, the first sensor element can be structured as a metallic pin that extends horizontally and the second sensor element can be structured as a metallic pin that extends horizontally. In other embodiments, the first and second sensor elements can be terminal ends of lead lines extending from a control device 190 or other types of sensor elements.

In some embodiments, the housing can be sized and configured to be attachable to a neck of the body of the garment. The housing can have a first chamber that extends vertically and a second chamber that extends vertically, a wall dividing the first chamber from the second chamber, at least one first sensor element positioned in at least one first sensor element opening of the housing to position the at least one first sensor element at least partially within the first chamber to detect a presence of liquid water within the first chamber, and at least one second sensor element positioned in at least one second sensor element opening of the housing to position the at least one second sensor element at least partially within the second chamber to detect a presence of liquid water within the second chamber.

In some embodiments, the water garment can include a housing having a first chamber that extends vertically. A first sensor element can be positioned at least partially within the first chamber to detect liquid water within the first chamber. In other embodiments, there may be both a first sensor element and also a second sensor element that are each at least partially within the first chamber for detecting the liquid water. The first sensor element can be a metallic rod or pin that extends in a direction that is transverse to the first chamber. The second sensor element (when present) can also be a metallic rod or pin that extends in a direction that is transverse to the first chamber.

The control device can include hardware. For example, the control device can include a printed circuit board (PCB). The control device can also include a non-transitory computer readable medium (e.g. memory), at least one processor connected to the computer readable medium, and one or more transceivers connected to the processor and/or the computer readable medium. The control device can also include at least one circuit incorporated into the PCB and/or attached to the processor and/or the computer readable memory. The control device can be configured to have a timer that is actuated when a resistance to electrical current or voltage obtained via the at least one sensor element is determined to have decreased to a first pre-selected threshold. The timer can be configured to count to the pre-selected period of time in response to actuation of the timer. The control device can be configured to reset the timer upon determining that the resistance increased to a value that is above the first pre-selected threshold. The control device can also (or alternatively) be configured to adjust the first pre-selected threshold to a second pre-selected threshold value after the timer is actuated. The control device can be configured to reset the timer upon determining that the resistance increased to a value that is above the second pre-selected threshold.

The water garment can include other elements. For instance, the water garment can also include an output device connected to the control device and an input device connected to the control device. The control device can be configured to actuate the output device to emit at least one warning to indicate inflation of the inflation mechanism will occur at a future time unless input is provided via the input device to reset the timer. The control device can also be configured to transmit an emergency signal for wireless communication after actuation of the inflation mechanism.

In some embodiments, the inflation mechanism can include a spring held compressed by a cap/stopper piece engaging a split cylinder/tube on an angled face. A cord can be wrapped around the outside of the cylinder holding it in a compressed state. A resistor configured to heat up and cut the cord to allow the cylinder/tube to extend out of its compressed state and move outward, releasing the cap and the spring. The split cylinder/tube can have at least one hinge about which the parts of the cylinder/tube move when moving between its compressed and extended states. The resistor can be configured to melt the cord to cut the cord. A portion of the cord can be arranged around the cylinder/tube so that as the cord is melted by the resistor, it engages a cutting wire for further cutting of the cord. The cylinder/tube can have a non-circular cross section to help with alignment of the spring and cap/stopper piece.

The water garment body can be structured in different ways. For instance, the water garment body can be configured as a vest, a shirt, or a jacket.

Methods of inflating a water garment can include wearing an embodiment of the water garment in the water. Embodiments of the method can also include the control device detecting submergence of the at least the part of the head of the user wearing the body continuously for a pre-selected period of time via the at least one sensor element and the control device actuating the inflation mechanism for inflation of the at least one inflatable chamber in response to the detecting of the submergence of the at least the part of the head of the user.

These and other objects, aspects and advantages of the present invention will be better appreciated in view of the drawings and following detailed description of certain exemplary embodiments thereof.

BRIEF DESCRIPTION OF THE DRAWINGS

Exemplary embodiments of a water safety garment, a related apparatus for automatic inflation to avoid drowning, and embodiments of methods for making and using the same are shown in the accompanying drawings. It should be understood that like reference numbers used in the drawings may identify like components.

In FIG. 13, a first sensor element 121 and a second sensor element 122 are shown within the first and second sensor element retention openings 120p and 120q.

DETAILED DESCRIPTION OF EXEMPLARY EMBODIMENTS

Figure 1:
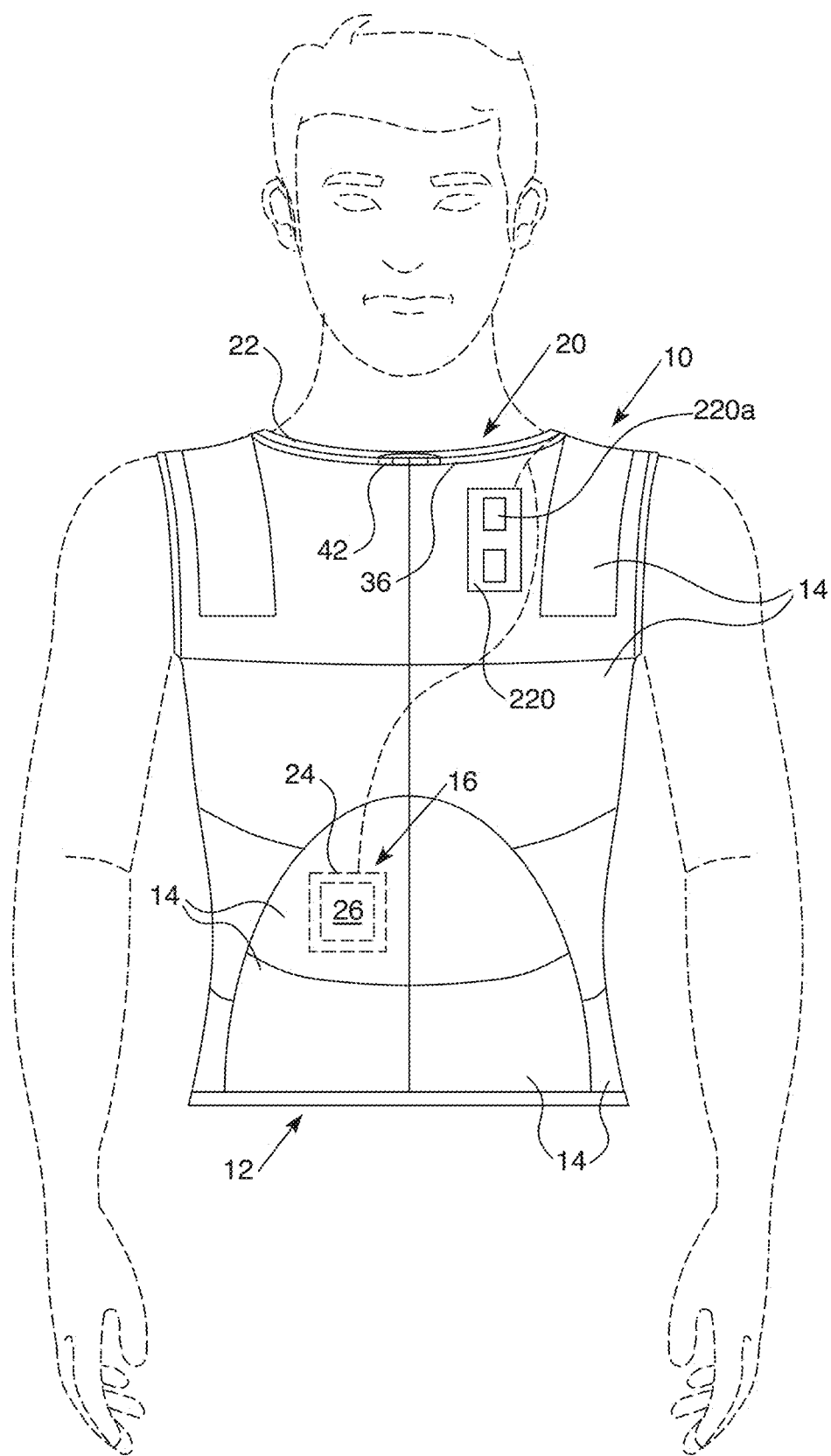
FIG. 1 is a front view of a water safety garment, according to an exemplary embodiment of the present invention.
Figure 2:
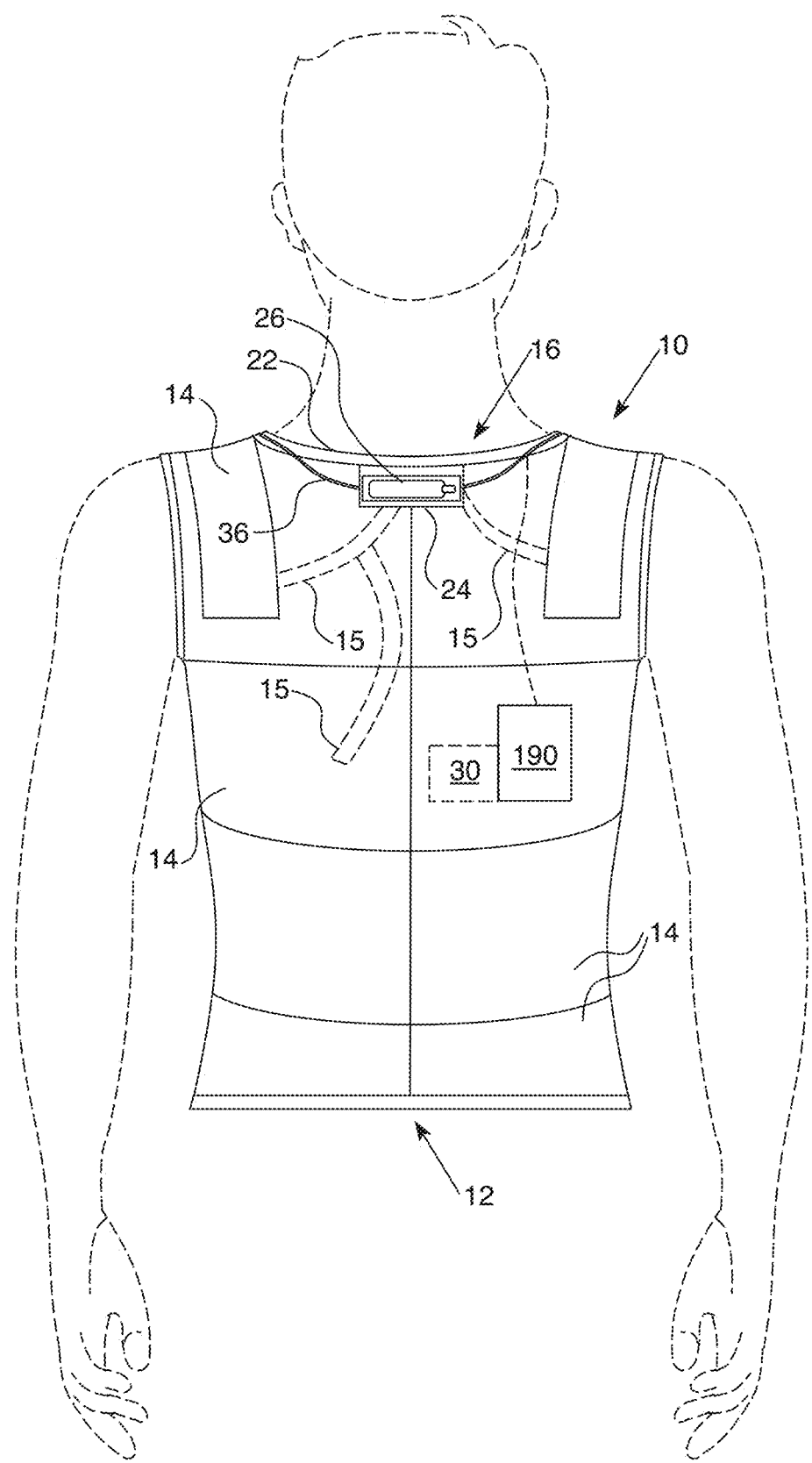
FIG. 2 is a rear view of the water safety garment of FIG. 1.

Referring to FIGS. 1-2, according to an exemplary embodiment of the present invention, a water safety garment 10 includes a garment body 12 with a plurality of inflatable chambers 14, an inflation mechanism 16 and an activation mechanism 20. Each inflatable chamber 14 can be configured as an inflatable bladder that can inflate via gas being fed therein to make the garment 10 more buoyant so that a person wearing the garment is forced to the surface of a body of water the person may be in.

Figure 3:
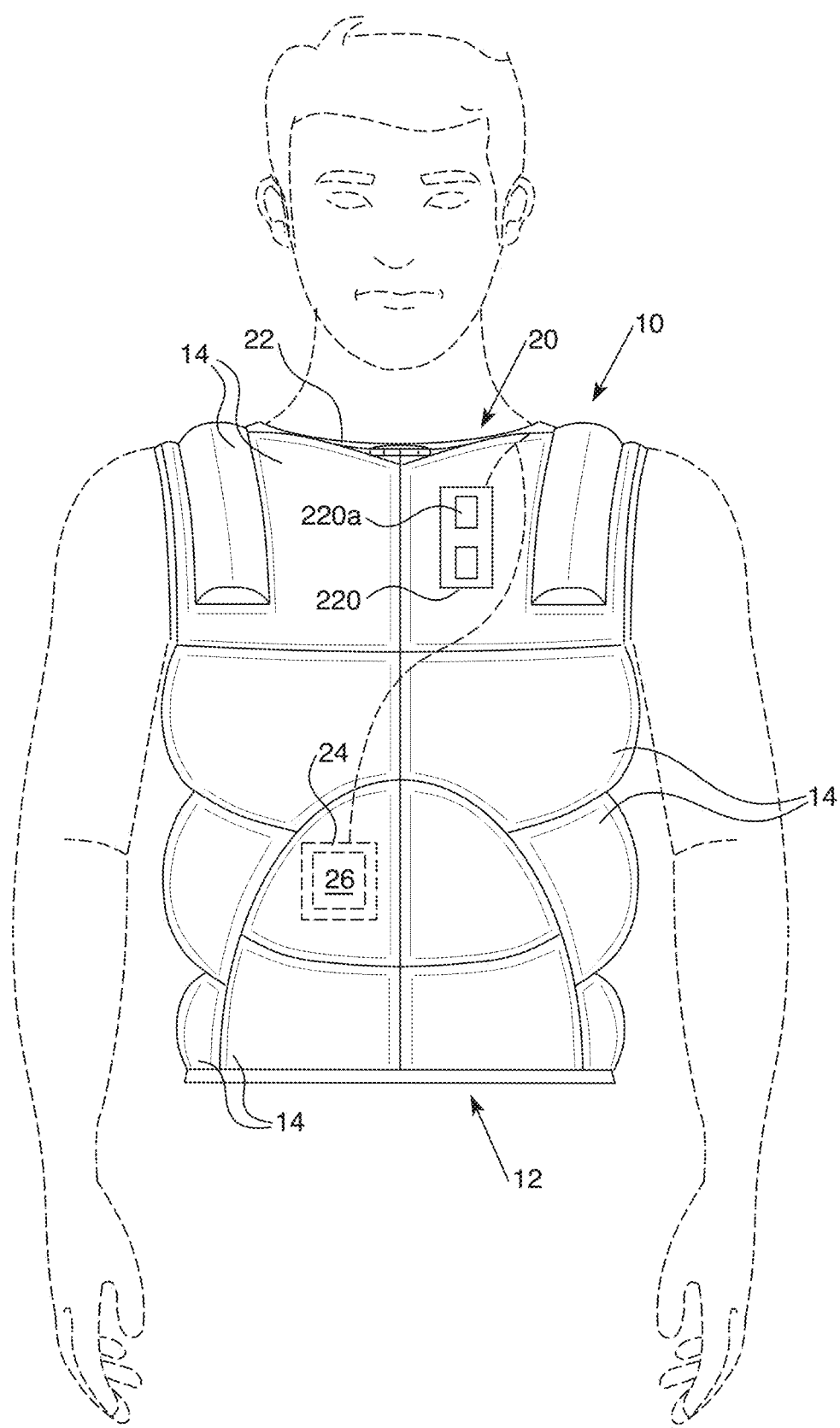
FIG. 3 is a front view of the water safety garment of FIG. 1, after inflation thereof.
Figure 4:
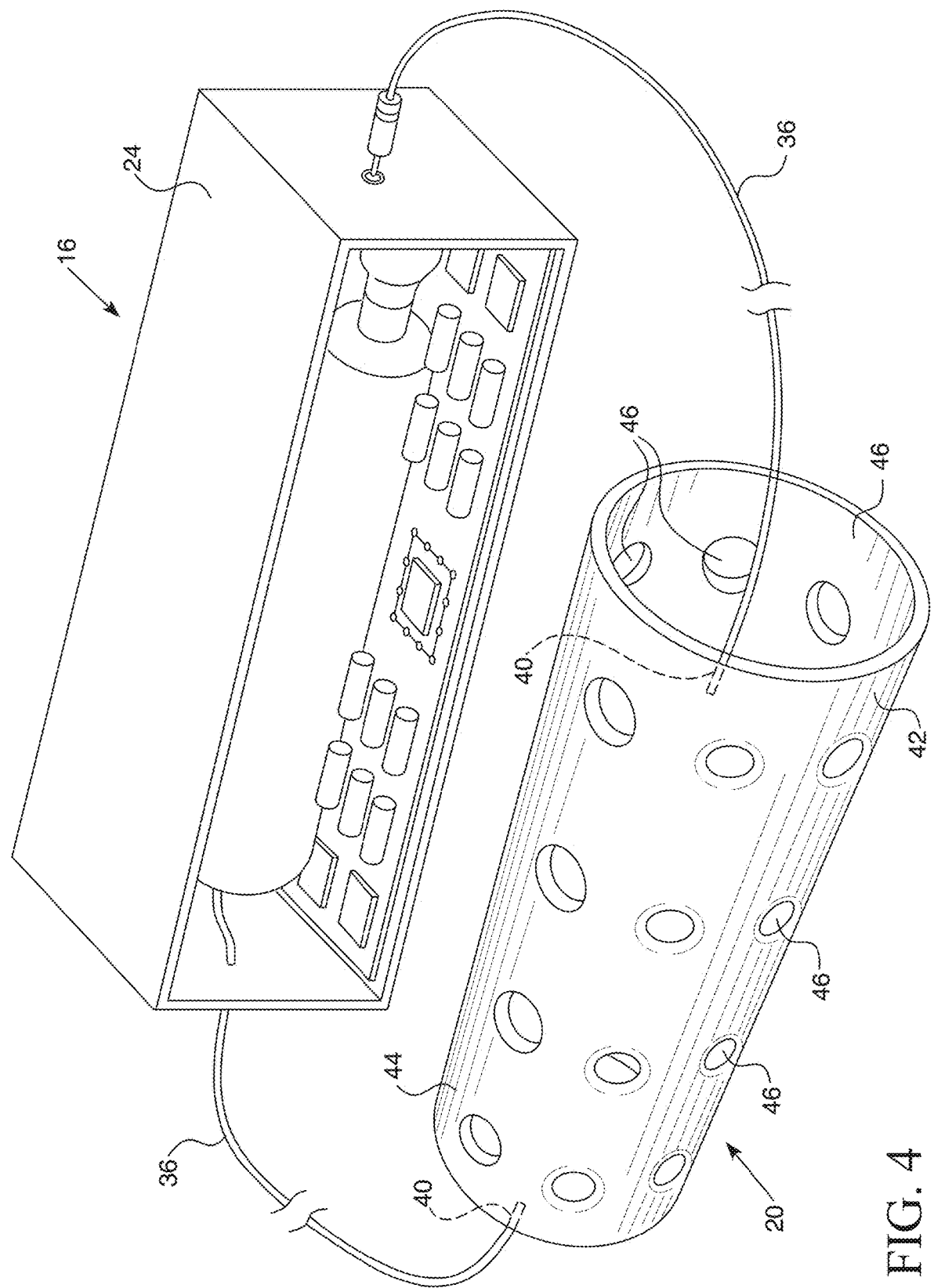
FIG. 4 is a perspective view of an inflation mechanism and an activation mechanism of the water safety garment of FIG. 1.

The inflation mechanism 16 can be connected to the inflatable chambers 14 and can be configured to inflate the inflatable chambers 14 after the activation mechanism 20 remains submerged for a predetermined time period, as may be seen in FIG. 3, for example.

In the depicted embodiment, the garment body 12 is configured as a vest. It will be appreciated that the garment body 12 could take other forms; for example, neck and/or arm collars, a shirt, a jacket, a girdle, etc. In general, the garment body 12 and inflatable chambers 14 can be configured to support the wearer in a desired position after inflation; most typically with the wearer's mouth and nose clear of the water's surface. The number of inflatable chambers 14, position of these chambers on the body 12 of the garment 10, and the size of those chambers can be configured to provide sufficient bouncy for different sized people. For instance, a small garment sized for a child may only have one relatively small inflatable chamber 14 or a few relatively small inflatable chambers 14 while a garment 10 having a body 12 sized for a person over six feet tall or a person who may weigh over 100 kilograms may have one more inflatable chambers 14 that are much larger.

Figure 35:
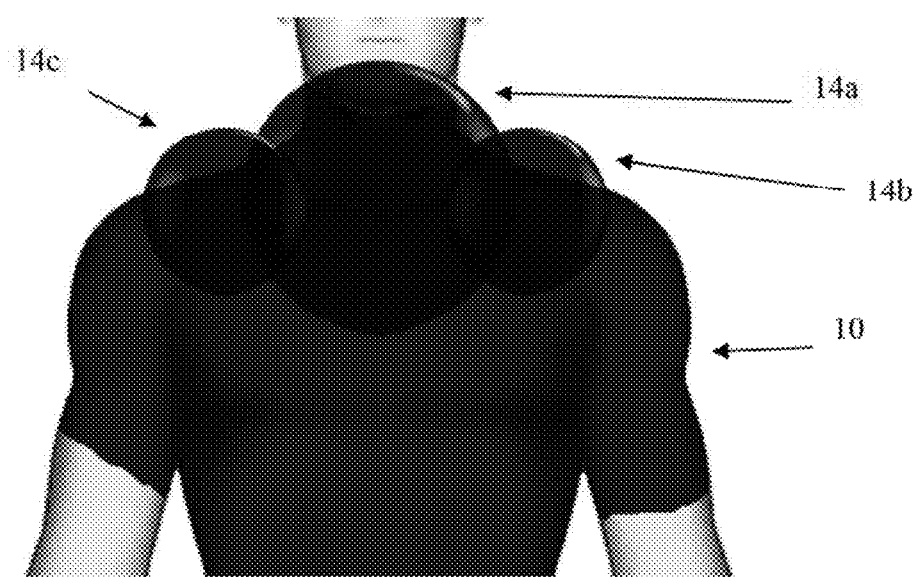
FIG. 35 is a schematic view of an exemplary embodiment of the water safety garment that illustrates an exemplary position of inflatable chambers on the body of the garment.

For example, an embodiment of the garment can include an asymmetric positioning of inflatable chambers 14 that include a first central inflatable chamber 14a that is positioned around a neck of the garment as shown in FIG. 35. A second inflatable chamber 14b and a third inflatable chamber 14c can be positioned on opposite left and right sides of the garment adjacent to where a person's shoulders would be when the garment is worn. The second inflatable chamber 14b and the third inflatable chamber 14c can each be the same size and also be smaller than the first central inflatable chamber. In other embodiments, it is contemplated that the second and third chambers 14b and 14c can be differently sized or about the same size. Of course, other embodiments can utilize other arrangements of one or more inflatable chambers (e.g. use a fourth inflatable chamber and/or a fifth inflatable chamber, use less than three inflatable chambers, use a single inflatable chamber at a different location, etc.).

In some embodiments, the inflatable chambers can include inflatable chambers arranged asymmetrically around a neck of the body 12 of the garment. At least one inflatable chamber 14 can be positioned adjacent opposite sides of the neck of the body 12 (e.g. left and right sides) and there can also be one or more inflatable chambers positioned at a portion of the body 12 that is coincident with a person's chest, belly, and/or back when the garment 10 is worn.

The inflation mechanism 16 and activation mechanism 20 can be arranged around a neck 22 of the garment body 12. The inflation mechanism 16 and/or activation mechanism 20 could also (or alternatively) be located elsewhere (e.g. on a goggles, on a mask, on swimming headwear, etc.). For instance, the inflation mechanism 16 can include a gas source 26 that is provided within a respective inflatable chamber 14 (e.g. a first gas source 26 within a first inflatable chamber 14, a second gas source within a second inflatable chamber 14, etc.). One example of such a positioned inflation mechanism that is within an inflatable chamber is shown in broken line to indicate the inflation mechanism having the gas source is within the inflatable chamber 14 in FIG. 10.

As another example, a gas source 26 can be in fluid connection with one or more inflatable channels via at least one conduit 15 for providing gas to inflate those chambers upon actuation of the inflation mechanism 16 that may occur via the activation mechanism 20. For instance, at least one gas source can be attached to an external surface of an inflatable chamber 14 and be attached thereto such that opening of the gas source can feed gas from the gas source into the inflatable chamber 14 to inflate the chamber. As another example, at least one gas source 26 can be positioned in or on the inflatable chamber 14 so that upon actuation of an inflation mechanism the gas from the gas source is fed directly into the inflatable chamber.

As yet another example, there may be multiple inflation mechanisms 16 having gas sources 26. At least one can be attached or positioned within at least one inflatable chamber 14 and at least a second inflation mechanism 16 can be connected via conduits 15 to other inflatable chambers 14 as shown, for example, in FIGS. 1-2 and 10. The conduits 15 can be tubes or ducts that may be woven, sewn, fastened, or otherwise incorporated (e.g. positioned for extending within pockets sewn or otherwise formed into the body 12, etc.) into the garment body that extend from a housing 24 and/or gas source 26 to an inflatable chamber 14.

It is contemplated that the positioning of the activation mechanism 20 having sensor elements near or on the neck of the wearer can be advantageous in that submergence of the sensor elements of the activation mechanism 20, located on the front, side, or rear of the neck 22, is generally indicative of a potentially hazardous orientation of the wearer in the water.

The inflation mechanism 16 includes a housing 24 inside which at least a gas source 26 is arranged. A power source 30, timer 32 and trigger 34 can also be arranged in this housing 24 or may be arranged in different housings and be in operative connection with the gas source for opening the gas source to inflate one or more inflatable chambers 14 upon a detection of a submergence event that extends over a pre-selected period of time. The pre-selected period of time can be 2 minutes, more than 2 minutes or less than 2 minutes. In some embodiments, the pre-selected period of time can range from 10 seconds to 6 minutes, 20 seconds to 6 minutes, 20 seconds to 5 minutes or other time periods. For example, it is contemplated that the pre-selected time period utilized in most commercial embodiments may range from six minutes to a time that is less than six minutes but above 0 seconds.

The pre-selected period of time for the timer 32 can also be configured to be user selectable from a range of input options that may range from 20 seconds to 5 minutes in some embodiments. For instance, a user may use a user interface 220 to provide input for selecting a pre-selected time period that may best meet that person's needs. A more advance swimmer or surfer may select a time period of 3 minutes, 4 minutes, or five minutes for the pre-selected time period to account for a time length at which that person may swim underwater to ensure inflation is delayed to avoid undesired inflation while the person is swimming underwater. A less advanced swimmer or a parent of a child who may wear the garment may select a time period of much shorter duration to account for less swimming skill or other health concerns. For example, a pre-selected time period of 20 seconds, 30 seconds, or 45 seconds may be utilized for a child or a time period of 1 minute or no more than two minutes may be selected for a less advanced swimmer.

The gas source 26 can be a source of gas such as, for example, carbon dioxide ($CO_2$), nitrogen ($N_2$), air, or other gas or mixture of gases. For example, the gas source 26 can be structured as a vessel that retains $CO_2$, another gas, or a mixture of gases (e.g. air comprising $CO_2$, $N_2$, and oxygen ($O_2$)).

It should be appreciated that any suitable gas source and corresponding trigger can be used. For instance, the gas source 26 can include one or more compressed gas cylinders, with the trigger functioning to puncture or otherwise open the cylinder(s), allowing gas to flow therefrom and into the chamber(s) 14. As another example, the gas source 26 can include a gas generator which uses one or more chemical reactions to generate the inflation gas, with the trigger functioning to initiate the chemical reaction(s) to generate the gas for inflating the inflatable chambers.

The power source 30 preferably includes one or more batteries. In some embodiments, the power source 30 can be configured as a single AAA sized battery, single coin cell battery or other type of single battery. In other embodiments, the power source may include multiple batteries (e.g. multiple AA batteries, A batteries, AAA batteries, C batteries, coin cell batteries, button cell batteries, etc.).

The housing 24 is preferably either watertight and/or the individual internal electrical components are sufficiently sealed against water intrusion. Additionally, different components of the inflation mechanism could be distributed in different locations with watertight connections being made therebetween.

The timer 32 can be implemented via analog or digital components. In either case, the timer 32 can be set to measure a predetermined time period corresponding to a desired delay before triggering of the inflation mechanism 16 and inflation of the garment 10. As discussed above, the predetermined time period can be user selected and the user selection can be stored in memory so that the timer utilized the user selected time period when the timer is activated in response to detection of a submergence event. For example, a predetermined time period in the range of 30 to 60 seconds is believed to be advantageous as long enough to allow a wearer to spend an appreciable amount of time underwater while short enough to ensure the wearer's air supply has not been exhausted. As discussed herein, the predetermined time period can be permanently preset into the timer 32, or the inflation mechanism 16 can allow for a wearer to modify the predetermined time period, preferably within a preset range.

The activation mechanism 20 can be configured as an activation circuit that is connected to the power source 30 and timer 32 via insulated leads 36. In some embodiments, the activation mechanism 20 can be included into a control device 190. Terminal ends 40 of the leads 36 are exposed inside a chamber 42 and spaced apart so as to form a normally open circuit. The chamber 42 can be non-conductive or can be designed to have a minimal amount of conductivity that can avoid creating errors in the operation of the activation mechanism 20, timer 32, and/or inflation mechanism 16. For example, the chamber can be a body that is composed of polymeric material (e.g. plastic, polished plastic, etc.). The shape of the chamber 42 can be cylindrical, tubular, polygonal, or other shape that may meet a particular set of design criteria.

Figure 5:
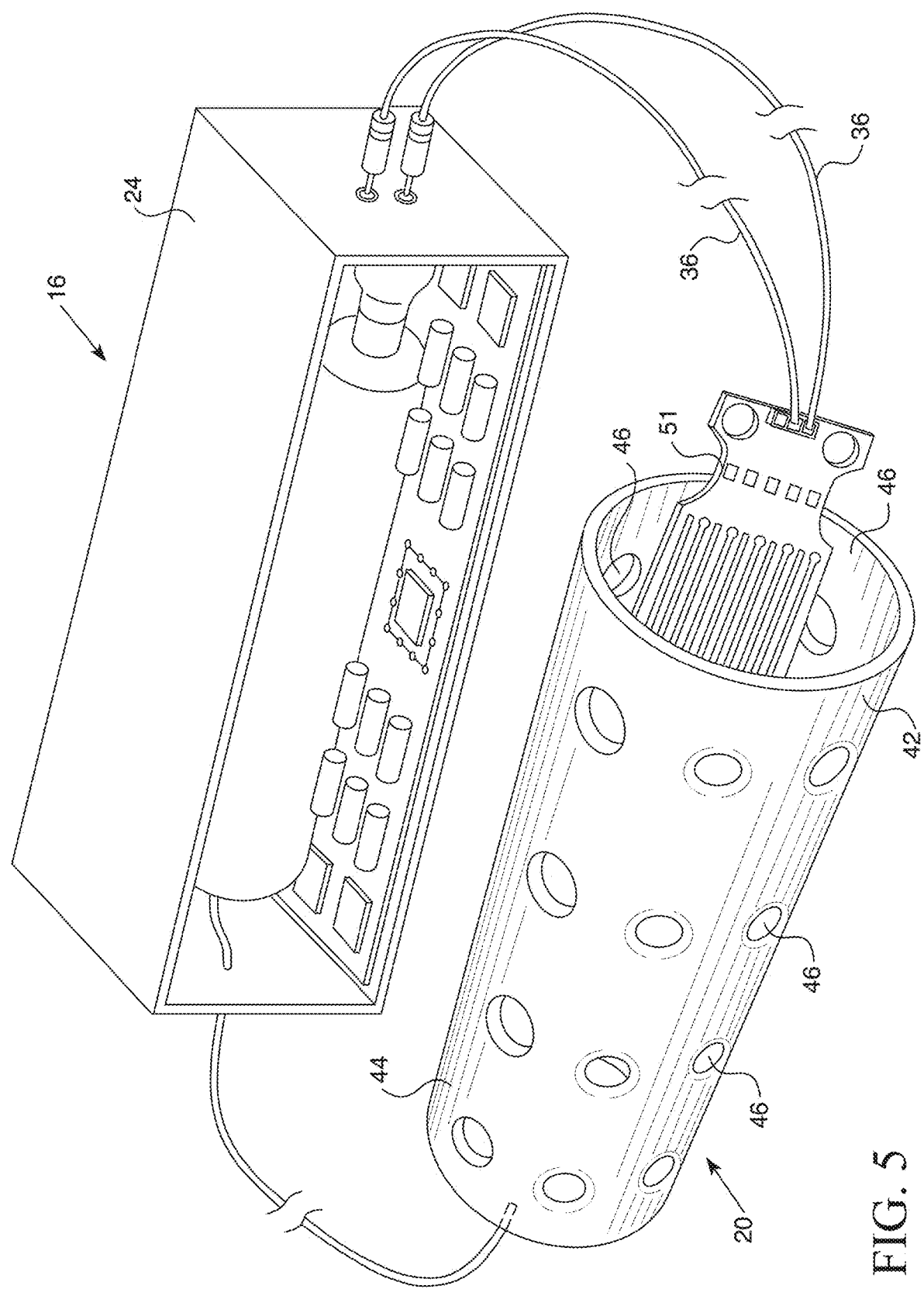
FIG. 5 is a perspective view of an inflation mechanism and an activation mechanism of a water safety garment, according to an exemplary embodiment of the present invention.
Figure 6:
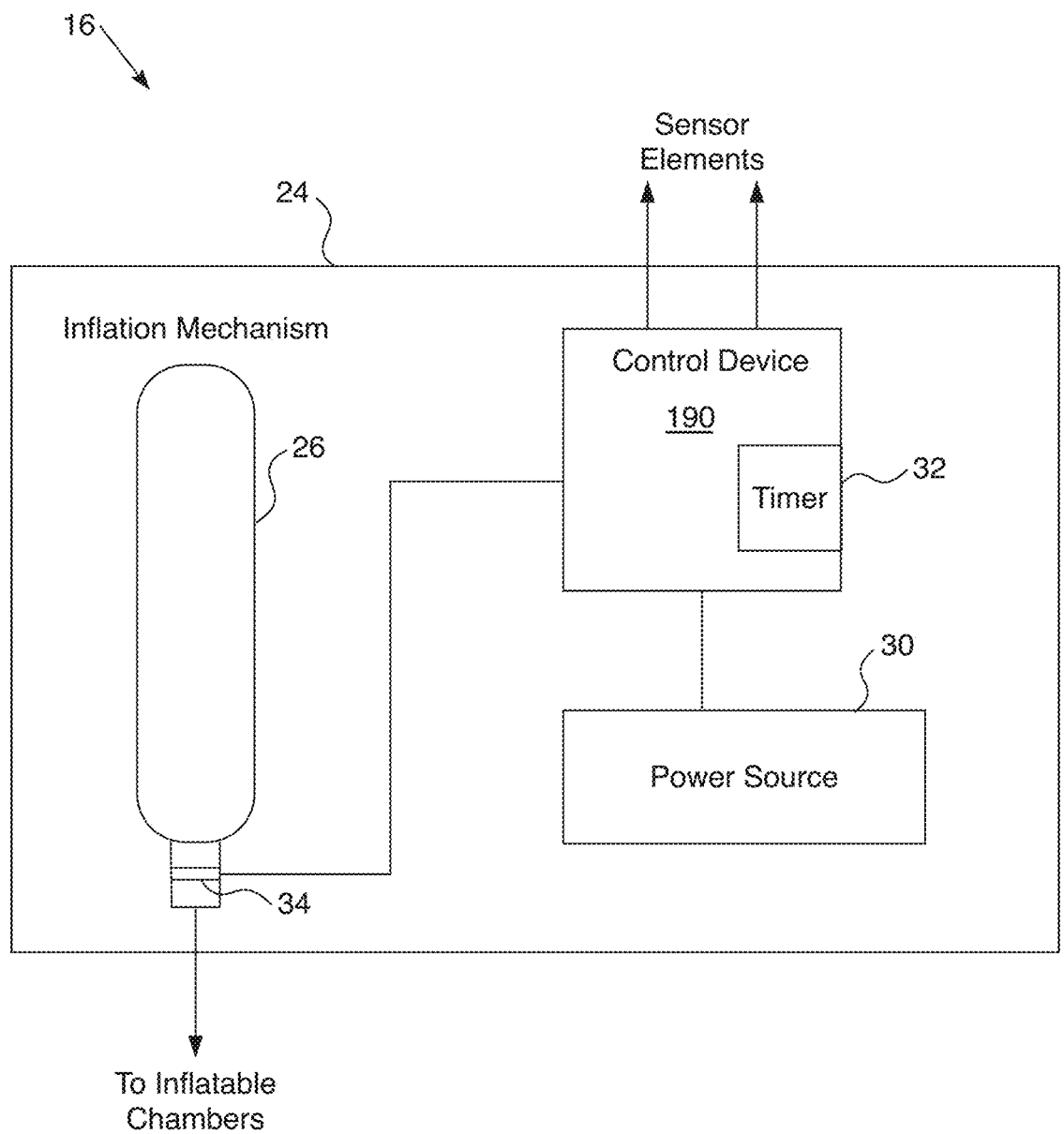
FIG. 6 is a block schematic view of an inflation mechanism a water safety garment, according to an exemplary embodiment of the present invention.

An outer wall 44 of the chamber 42 can have a plurality of openings 46 defined therein or at least one opening defined therein. The openings 46 can be sized and shaped to allow water to freely flood into and drain from the chamber 42 when the chamber 42 introduced into and removed from the water. In the embodiment depicted in FIG. 5, the chamber 42 is advantageously formed as a tubular cylinder having open ends and a plurality of additional openings within the circumferential sidewall, which is an outer wall 44.

Figure 10:
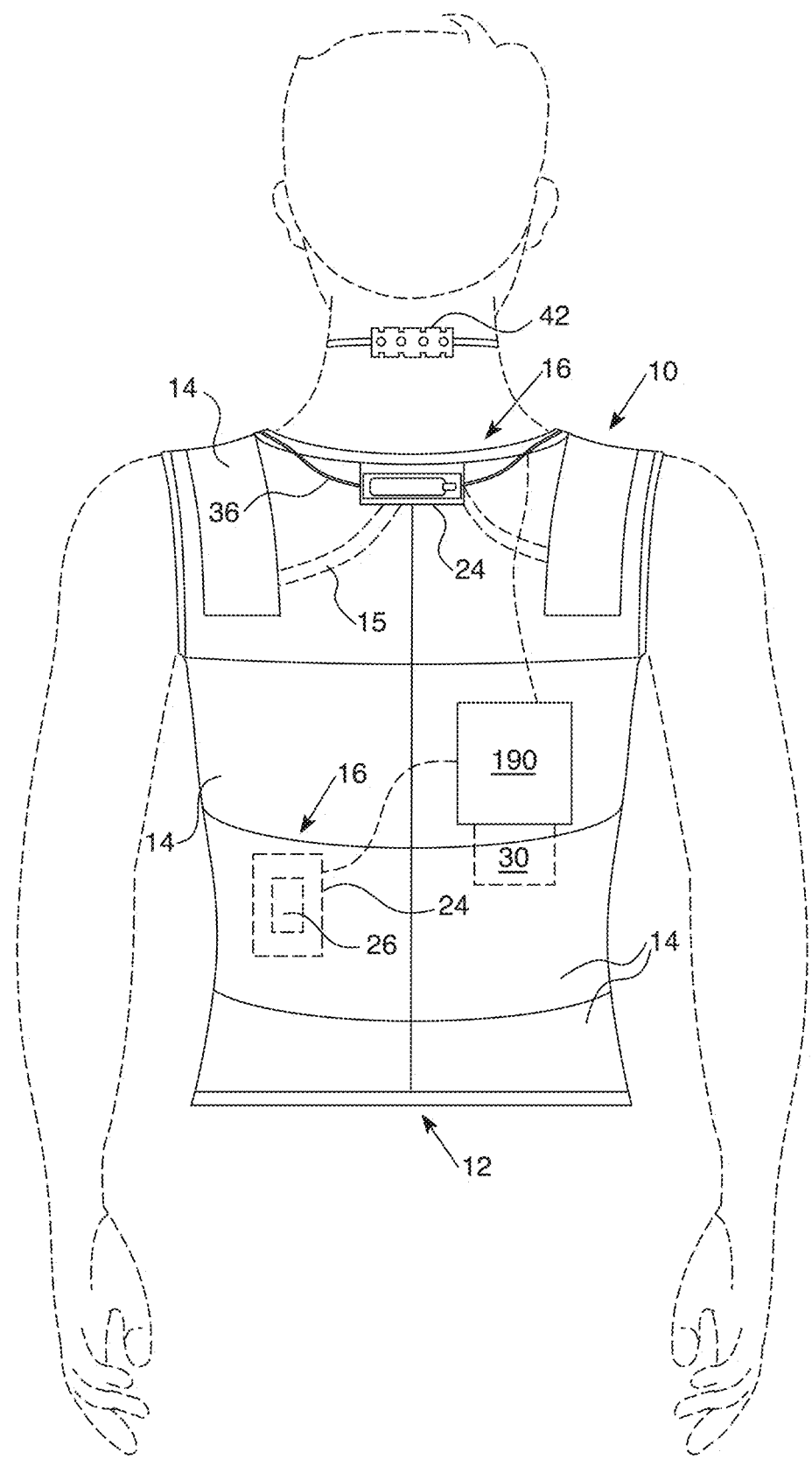
FIG. 10 is a rear view of a water safety garment, according to an exemplary embodiment of the present invention.
Figure 11:
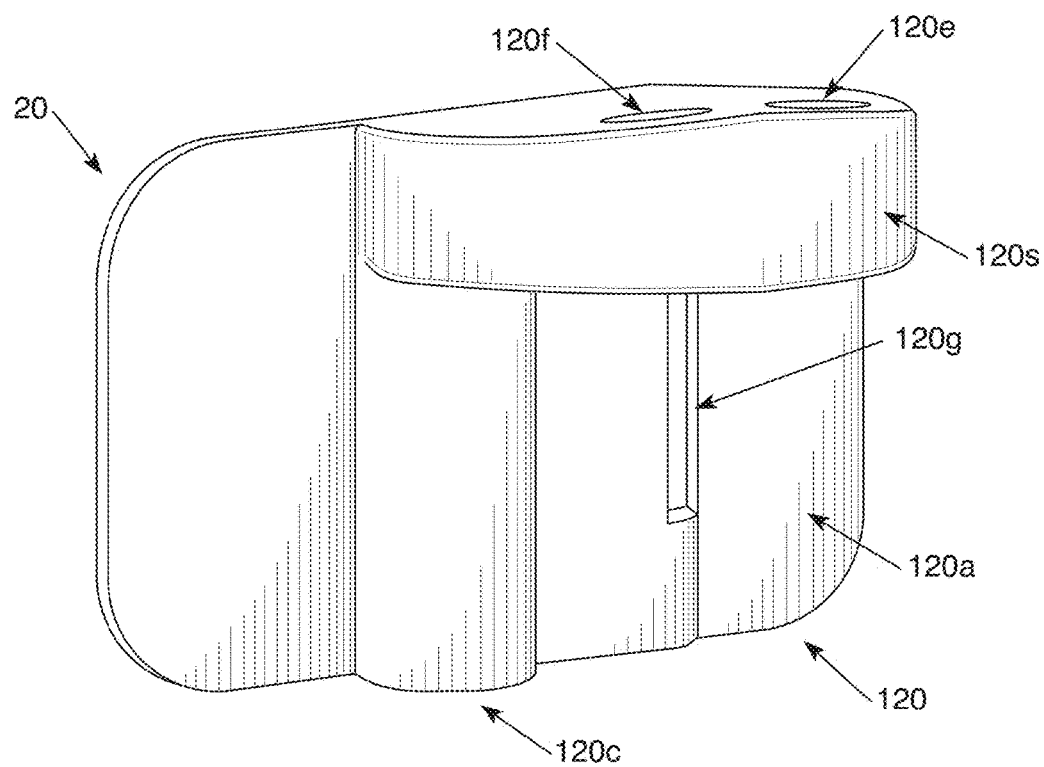
FIG. 11 is a fragmentary perspective view of an exemplary embodiment of an activation mechanism for communicating with an inflation mechanism for an embodiment of the water safety garment (e.g. the water safety garment of FIG. 1)
Figure 12:
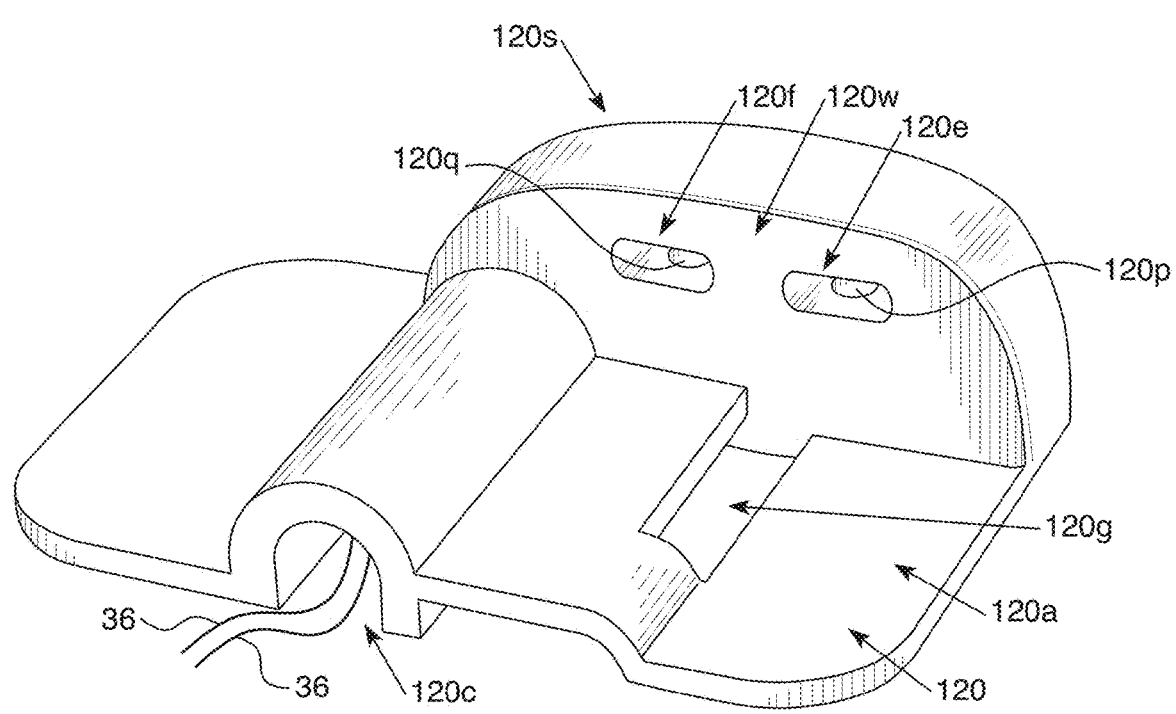
FIG. 12 is another fragmentary perspective view of the activation mechanism shown in FIG. 11. First and second sensor elements 121 and 122 are removed in FIG. 12 to better illustrate a first sensor element retention opening 120p and a second sensor element retention 120q.
Figure 13:
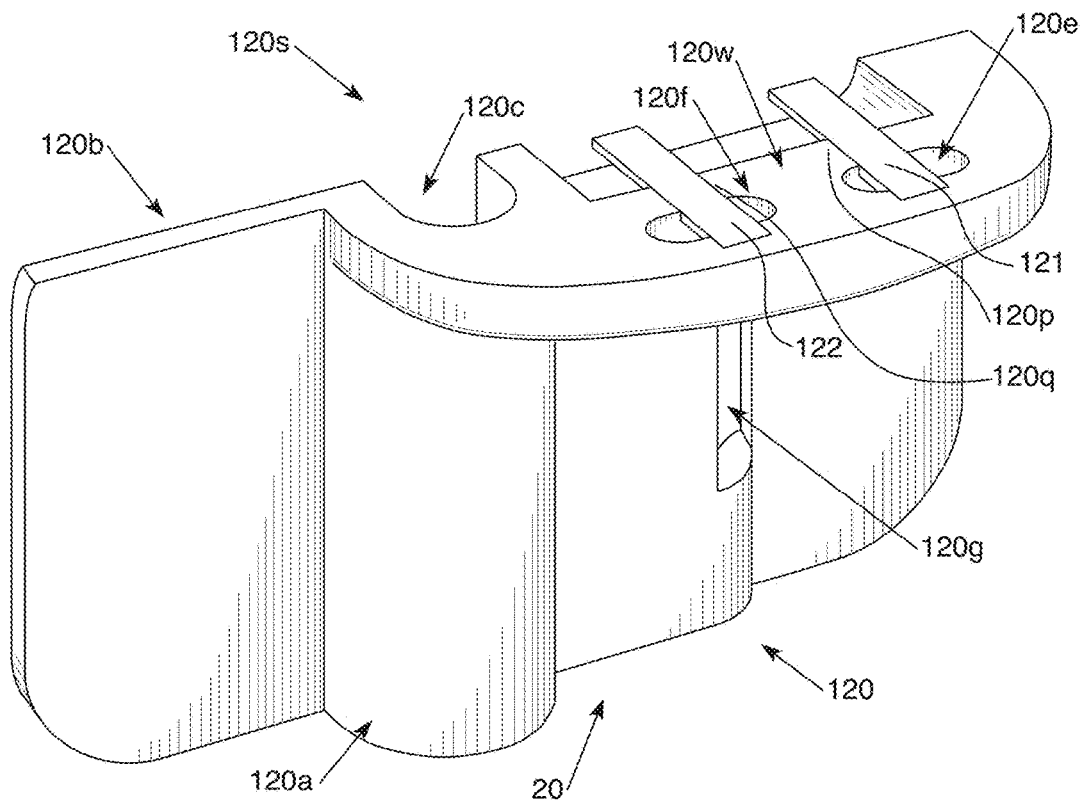
FIG. 13 is another fragmentary perspective view of the activation mechanism shown in FIGS. 11-12, with a portion cut away to illustrate internal components of the mechanism.

A person having skill in the relevant art, after having the benefit of this disclosure, would appreciate that there are several advantageous positions on a water safety garment 10 where one might dispose a non-conductive chamber 42 to ensure proper operation. As depicted in FIG. 10, a water safety garment 10 may include a non-conductive chamber 42 on a high neck line, thereby ensuring that the non-conductive chamber 42 would not fill with water during use unless the user is submerged at least to the point where the user's mouth and nose are under water. As additional non-limiting examples for position of a non-conductive chamber 42, a water safety garment 10 might also include a non-conductive chamber 42 on an ear piece or on the front of a pair of accompanying goggles.

In general, the chamber configuration can be configured to avoid both air- and water-lock leading to incomplete filling or draining that would prevent a desired inflation or cause an undesired one. Preferably, with the activation mechanism connected to the garment body 12, the terminal ends 40 of the leads 36 are oriented within the chamber 42 such that the circuit therebetween is only closed when the chamber 42 fill level is indicative of a submerged condition of the wearer, as opposed to transient water introduction.

In operation, a wearer dons the garment body 12. The wearer then enters the water. If the wearer enters the water sufficiently to fill the chamber 42 and close the connection between the terminal ends 40, the timer 32 begins counting down the predetermined time period. If the predetermined time period is reached while the circuit between the terminal ends remains closed, the trigger 34 activates the gas source 26 and the inflatable chambers 14 are automatically inflated. If the chamber 42 drains and the circuit opens between the terminal ends 40, the timer resets and remains ready for the next flooding of the chamber.

An inflation mechanism 16 according to at least one embodiment of the present invention may include a resistance sensor 51 capable of measuring the electrical resistance of a fluid inside a non-conductive chamber 42. The resistance sensor 51 can include at least one sensor element configured to detect a submergence condition. Preferably, with the activation mechanism 20 connected to the garment body 12, the resistance sensor 51 is oriented within the chamber 42 such that the sensor 51 is capable of measuring the electrical resistance of the fluid within the chamber 42. A person having skill in the relevant art will recognize, after having the benefit of this disclosure, that a resistance sensor 51 oriented within the non-conductive chamber 42 of an inflation mechanism will measure a high level of resistance when the fluid filling the chamber 42 is air.

In operation, if the wearer enters the water sufficiently to fill the chamber 42 with water, the resistance sensor 51 can measure a rapid decrease in the resistance of the fluid in the chamber 42. When water flows out of the chamber 42, being replaced by air, the resistance sensor 51 will measure a rapid increase in the resistance of the fluid in the chamber 42. A timer 32 may be triggered when a rapid decrease in the resistance of the fluid in the chamber 42 is detected by a resistance sensor 51, and a timer 32 may be reset when a rapid increase is detected.

Referring to FIGS. 11-16, exemplary embodiments of the activation mechanism 20 can include a housing 120 that has an outer surface 120a that faces away from the body 12 of the water garment and an inner surface 120b that faces the body 12 of the water garment. In some embodiments, the inner surface 120b can be directly attached and directly contact the body 12 of the water garment. For instance, the housing 120 can have at least one attachment opening 120g defined therein so that the housing 120 can be sewn and/or otherwise fastened to the body of the water garment (e.g. strap positioned through opening 120g to tie the housing 120 to the body 12, rivets, buttons, fasteners, staples, etc. for fastening housing 120 to body, combinations thereof, etc.) so that the inner surface contacts the body 12 of the water garment.

The housing 120 can define a detection body 120s and a conduit 120c through which lead lines 36 can pass between sensor elements (e.g. first sensor element 121 and second sensor element 122). The conduit 120c can be in communication with first and second sensor element retention openings 120p and 120q defined in the detection body 120s portion of the housing 120 so that a terminal end of a first lead line 36 can be connected to first sensor element 121 and a terminal end of a second lead line 36 can be attached to the second sensor element 122. The sensor element retention openings 120p and 120q can be defined such that they are each in communication with at least one chamber 42. For example, the first sensor element retention opening 120p can be in communication with a first chamber 120e defined in the detection body 120s of the housing and the second sensor retention opening 120q can be in communication with a second chamber 120f of the sensor retention body 120s. Each sensor retention opening 120p, 120q can be arranged to extend vertically between an upper open end and a lower open end so that water can fill into the chamber and also drain out of the chamber. The first sensor element 121 can be positioned in the first sensor element retention opening 120*p* so that at least an end portion of the first sensor element 121 is within the first chamber 120*e*. The second sensor element 122 can be positioned in the second sensor element retention opening 120*q* so that at least an end portion of the second sensor element 122 is within the second chamber 120*f*. In some embodiments, the first and second chambers 120*e* and 120*f* can be separate chambers that are separated by at least one wall 120*w* that is between the chambers. The wall 120*w* can be defined by the sensor detection body 120*s* or be a separate component attached thereto to separate the chambers.

In some embodiments, there can be an arrangement of sensor elements to facilitate redundancy in the event there is an error with a particular sensor element. For instance, there may be two first sensor elements 121 within the first chamber 120*e* and two second sensor elements 122 within the second chamber 120*f*. Each first sensor element can be within a respective first sensor retention opening 120*p* that is in communication with the first chamber 120*e* and each second sensor element 122 can be within a respective second sensor retention opening 120*q* that is in communication with the second chamber 120*f*. In yet other embodiments, there may be more than two sensor elements within each chamber to provide yet further redundancy.

It should be appreciated that redundant sensor elements may not be utilized in some embodiments. For example, some embodiments may only use a single first sensor element 121 and a single second sensor element 122 positioned in the first and second chambers 120*e* and 120*f*. As another example, other embodiments may only use a single sensor element in a chamber 42.

The wall 120*w* can be positioned to function as a divider of the first and second chambers 120*e* and 120*f* that can prevent drops of water from falsely bridging the sensor elements 121 and 122 when the housing 120 is not immersed in water. Such false bridging events an occur due to droplets of water remaining in contact with the sensor elements after the housing 120 is out of the water and water within each chamber has drained out of the chambers. It can be preferable to have the housing 120 to be polished, particularly in the portions defining the surface area of the first and second chambers 120*e* and 120*f* (and/or chamber 42) to be polished to help facilitate liquid water draining effectively and beading when droplets remain after draining. This can help avoid water droplets spreading rather than beading, which can result in a false positive detection bridging the sensor elements. Often, water can remain in the openings or chambers immediately adjacent the sensor elements after the liquid water is mostly drained from the chamber(s) (e.g. 120*e*, 120*f*, and/or 42). Facilitating water droplet beadings to prevent water spreading in a thin layer along a chamber provided by polished surfaces can help avoid this problematic false positive condition. The surface area of the chambers defined by the housing 120 can therefore be polished or otherwise formed to provide a pre-selected surface smoothness (or roughness) that facilitates beading of liquid water. In addition, using a low surface energy material, such a polypropylene, acetal, or polytetrafluoroethylene (PTFE), can help facilitate the beading and shedding of water.

The first and second sensor elements 121 and 122 can be part of an activation circuit of the activation mechanism 20 that can be configured to detect a submergence condition for use in activation of at least one inflation mechanism 16. For instance, each sensor element can be a metallic pin (e.g. stainless steel rod, stainless steel pin, metallic body, etc.). Each sensor element can be configured to facilitate the measurement of resistance within at last one chamber 42, 120*e*, and/or 120*f* or across the chambers 120*e* and 120*f*. The housing 120 can be comprised of a low surface energy plastic material that is relatively non-conductive to help facilitate the conductive sensor elements' ability to measure the resistance to electrical current within the chamber. This measurement is providable via an electrical current passed between the sensor elements 121, 122 and a control device 190 that is connected to the lead lines 36 to which the sensor elements 121 and 122 are connected for measuring the current or voltage and how the resistance to the current and/or voltage change due to the change in resistance that may result from the chambers to which the sensor elements are positioned filling with liquid water or emptying of water (e.g. the liquid water draining from the chamber and the chamber being filled with air instead of liquid water).

Figure 14:
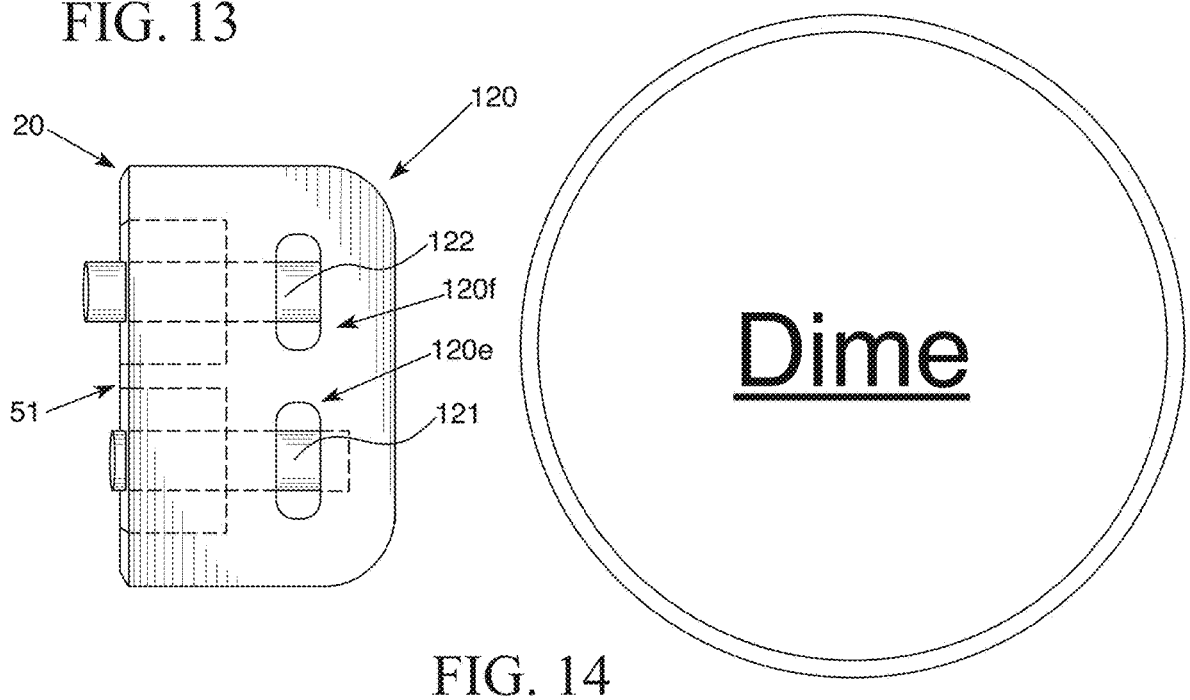
FIG. 14 is a perspective view of the activation mechanism shown in FIGS. 11-13 positioned next to a dime to help illustrate an exemplary size of the mechanism.
Figure 15:
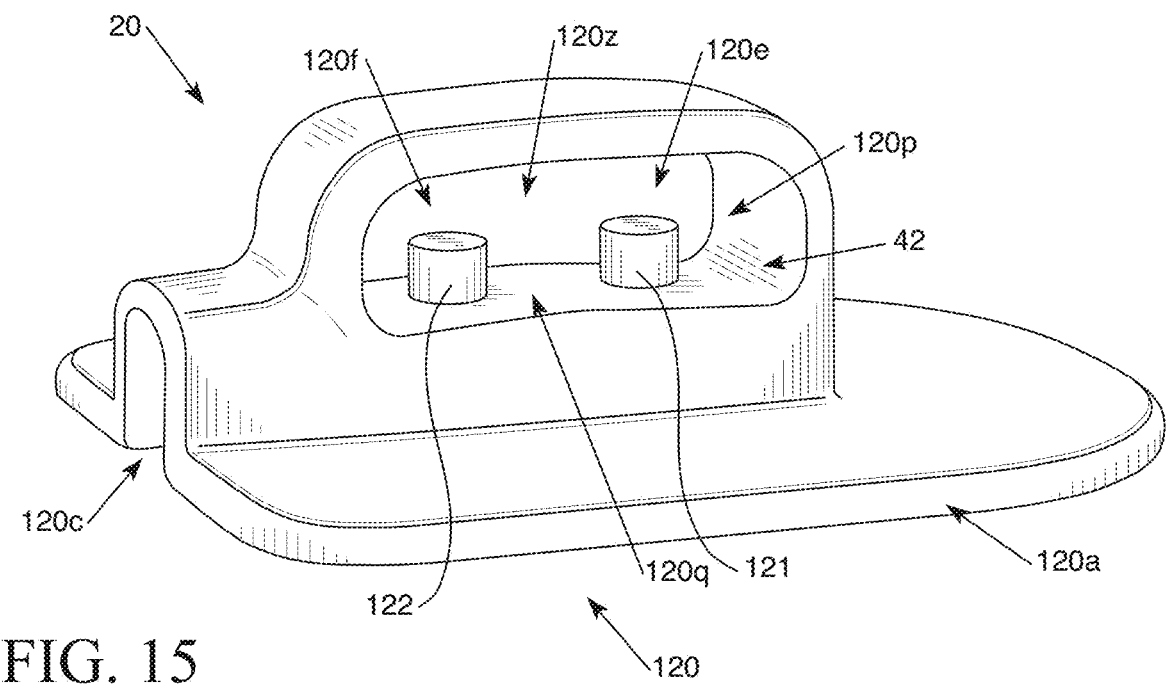
FIG. 15 is a perspective view of another exemplary activation mechanism for communicating with an inflation mechanism for an embodiment of the water safety garment (e.g. the water safety garment of FIG. 1)
Figure 16:
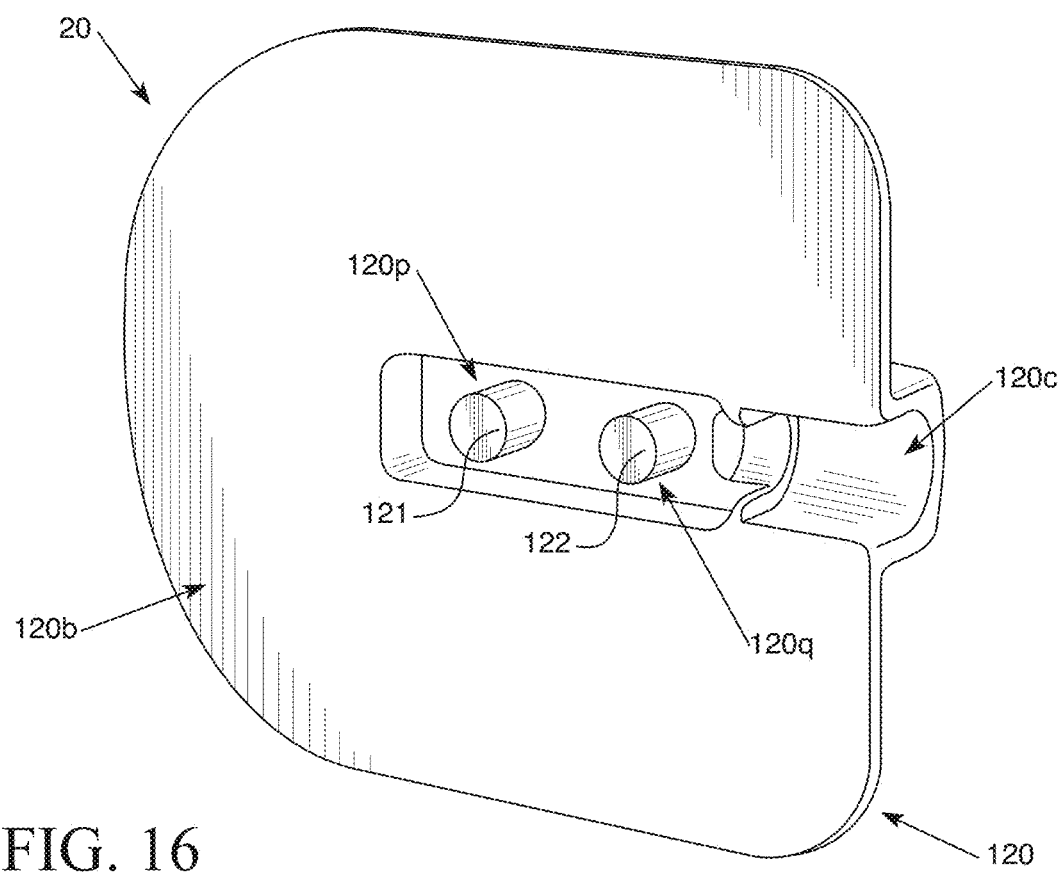
FIG. 16 is another perspective view of the activation mechanism shown in FIG. 15.

In other embodiments, such as the embodiment shown in FIGS. 15-16, the first and second chambers 120*e* and 120*f* can be segments of a larger chamber 42 that is structured as a single chamber 120*z*. In other embodiments, the first and second chambers 120*e* and 120*f* can each be separate chambers through which water is passable so that the sensor elements can detect water within the chambers and/or a rate at which the chambers are filling with water or emptying with water (e.g. as in the embodiment of FIGS. 11-14).

The housing 120 can be arranged so that the sensor elements 121 and 122 are positioned in the housing 120 so that they extend along their lengths horizontally (e.g. perpendicular to the length of at least one chamber (42, 120*e* and/or 120*f*) or can extend along their lengths transverse to the length of a chamber 42, 120*e* and/or 120*f*). Such an arrangement can permit the chambers used to fill with water and drain water for detection of a dangerous submerged condition to extend perfectly vertically or substantially vertically (e.g. within +/−5° of being perfectly vertical or within +/−10° being perfectly vertical) so that they can quickly empty water filled therein to avoid a false positive detection that would result in an undesired actuation of the inflation mechanism 16.

There may be only a single housing 120 for the activation mechanism 20 for attachment to the garment or a person wearing the garment. Alternatively, there can be multiple housings 120 positioned at different locations (e.g. at the left and right sides of a neck of the garment, the left and right sides of the garment's neck and also the rear and/or front of the garment by the neck of the garment, etc.). Each housing 120 can have first and second sensor elements 121, 122 that extend horizontally and have a distal end within a chamber of the housing 120. The opposite end of each sensor element can be connected to a lead line 36 that extends between the sensor element and the control device 190.

A presently preferred size for an embodiment of the housing 120 can be appreciated from FIG. 14, which shows that a dime of U.S. currency can be slightly larger in surface area than the housing 120 for some embodiments. Other embodiments of the housing 120 can be larger or even smaller to meet a particular set of design criteria.

Figure 17:
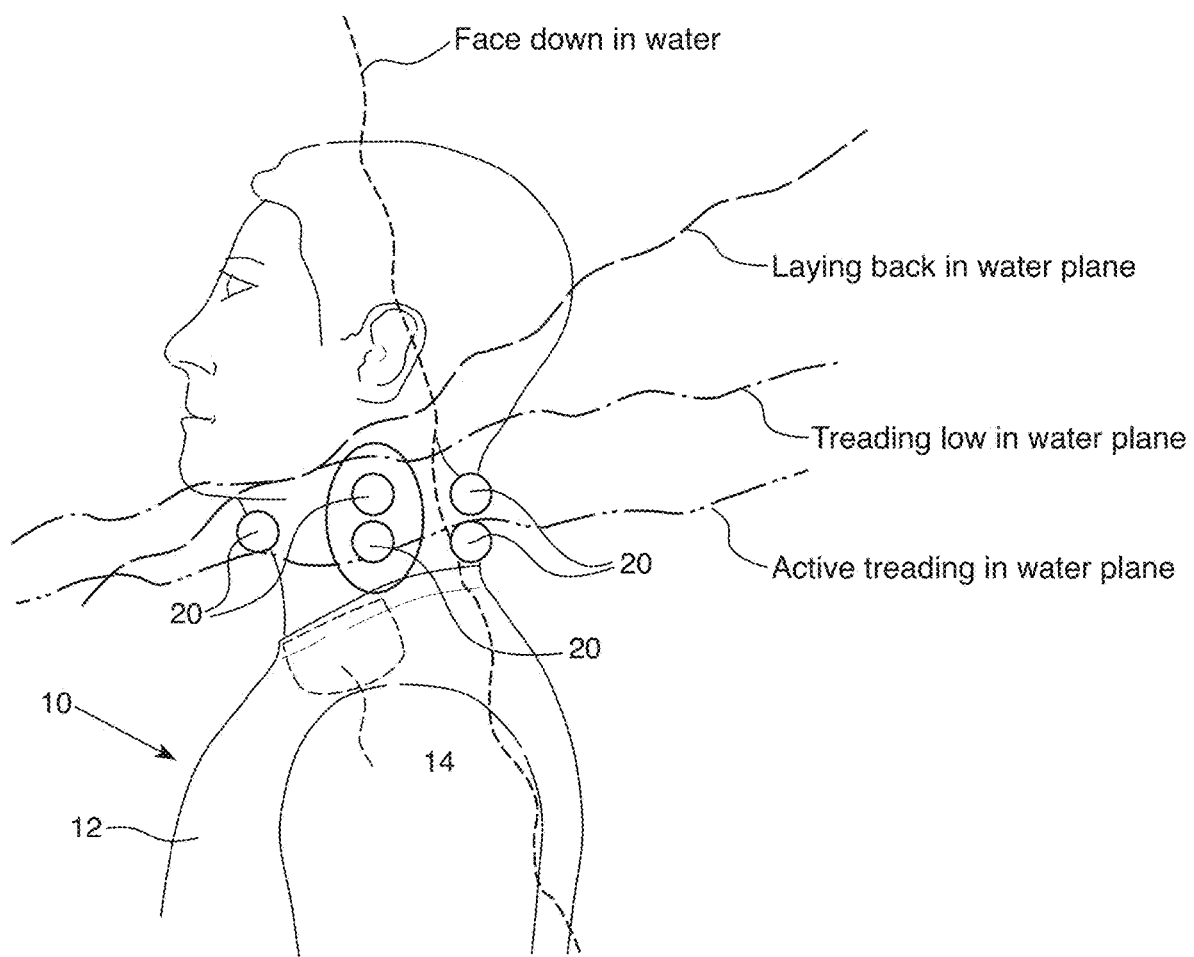
FIG. 17 is a schematic view of an water safety garment being worn by a person that illustrates exemplary locations at which an activation mechanism can be positioned.
Figure 18:
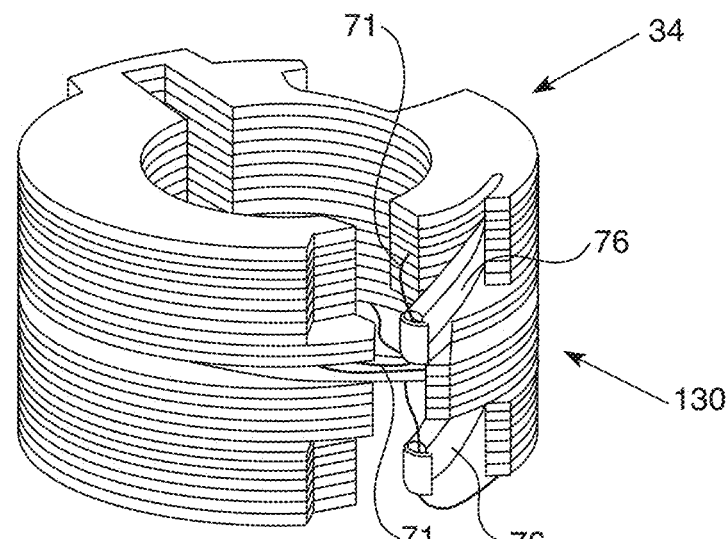
FIG. 18 is a fragmentary perspective view of an exemplary inflation mechanism that illustrates an exemplary component of the inflation mechanism that can be utilized to control actuation of the inflation mechanism.
Figure 19:
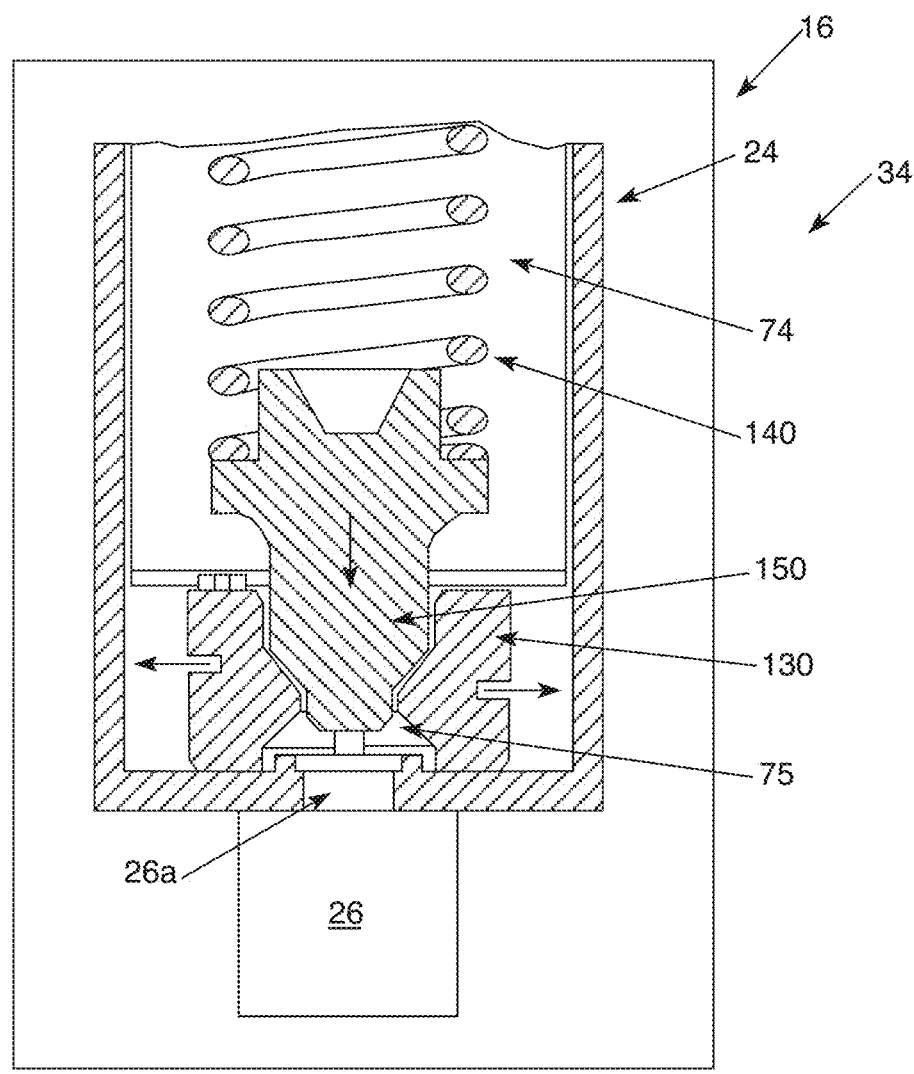
FIG. 19 is a schematic view of the inflation mechanism shown in FIG. 18 that illustrates actuation of the inflation mechanism by use of the component shown in FIG. 18.
Figure 20:
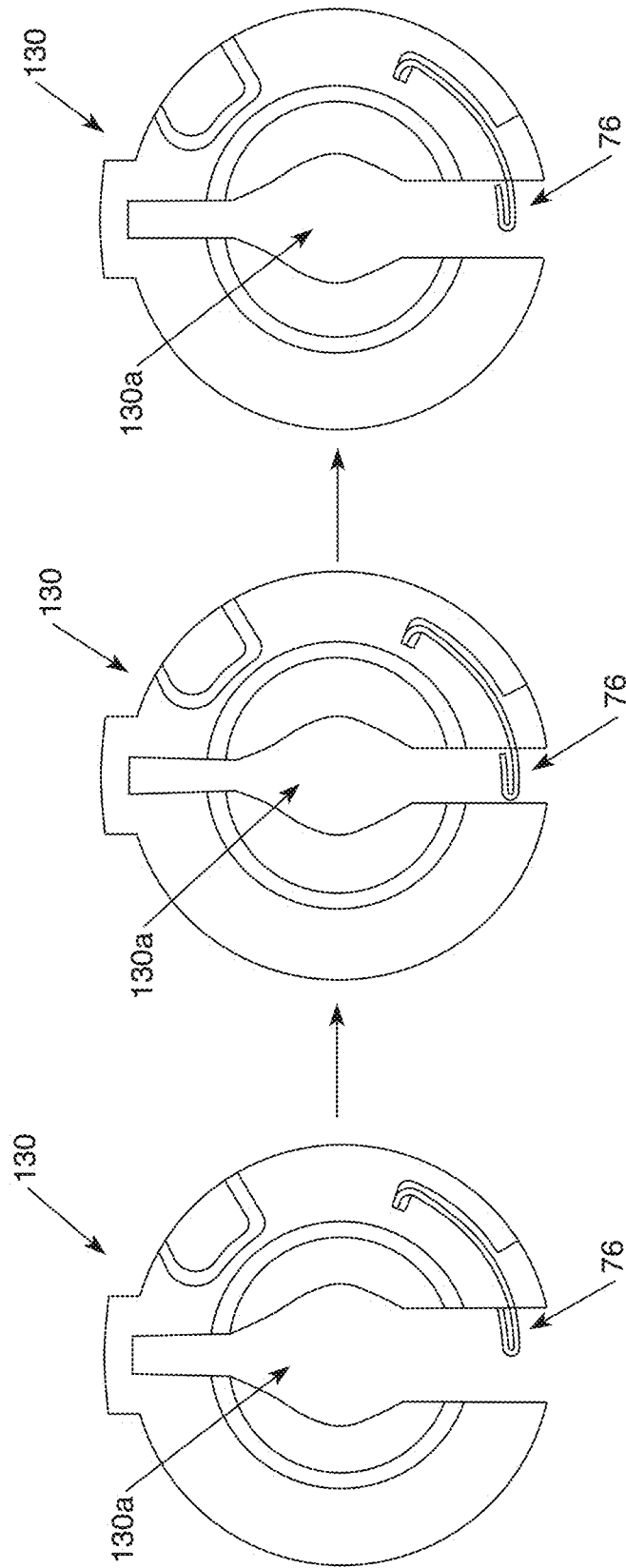
FIG. 20 is a schematic view of the component shown in FIG. 18 illustrating exemplary states of the component.
Figure 21:
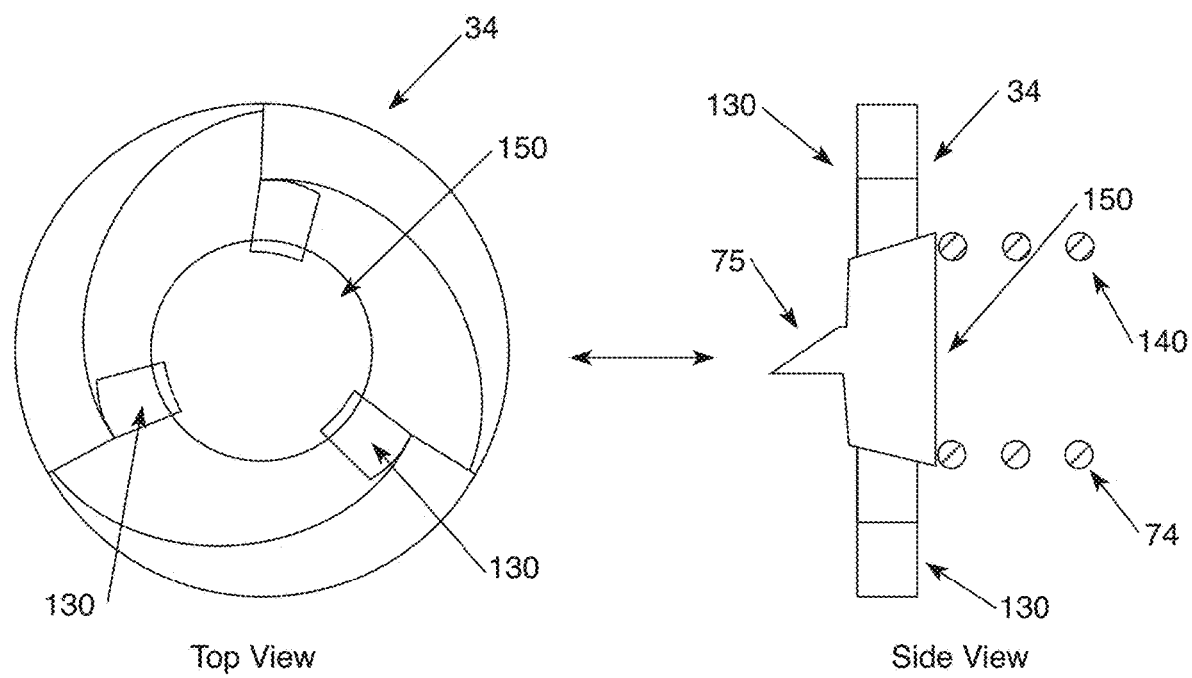
FIG. 21 is a schematic view of another exemplary inflation mechanism that illustrates components in a locked state that prevents actuation of the inflation mechanism.
Figure 22:
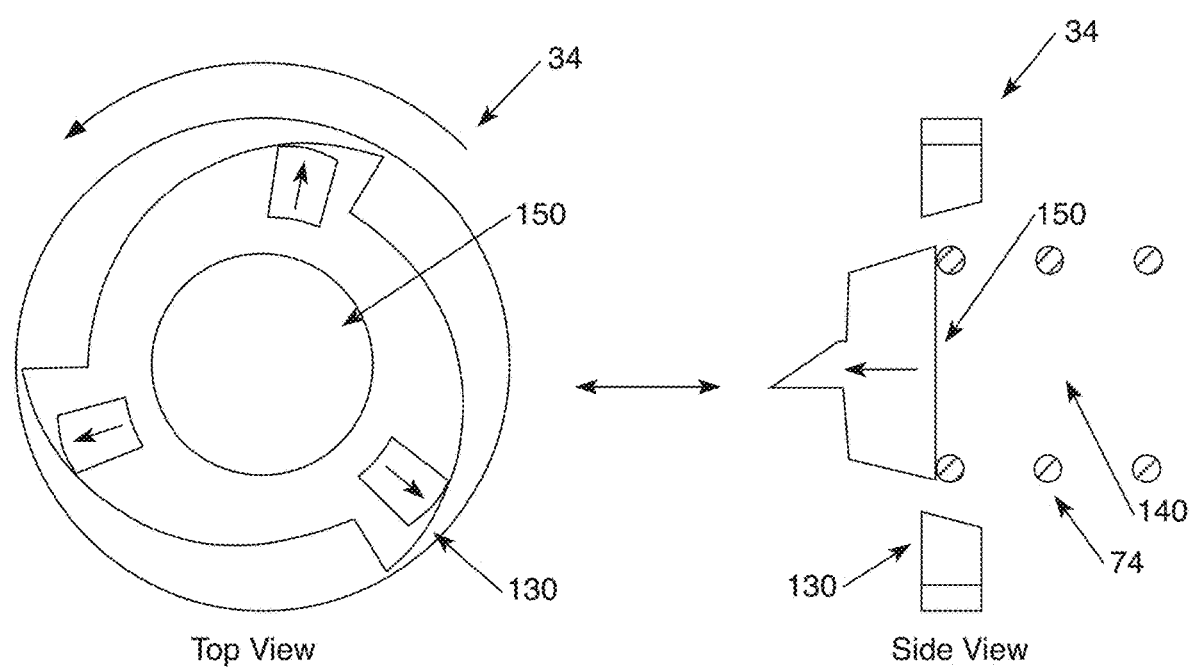
FIG. 22 is a schematic view of the exemplary inflation mechanism shown in FIG. 21 to illustrate components in a released state that permits actuation of the inflation mechanism via the biasing mechanism.

The preferred positioning of the housings 120 of the activation mechanism 120 having first and second sensor elements 121 and 122 can be appreciated from FIG. 17. In particular, a most preferred position can be the left and/or right sides of the neck of the garment that is positioned to be relatively high on the neck of the person wearing the garment. This position can be near the cheek bone and/or ear of the person wearing the body 12 of the garment 10.

Based on research that has been conducted, it was determined that if the housing 120 having the sensor elements were positioned lower, it can result in a number of false positives that could lead to an undesired inflation of the inflatable cavities. If the housing 120 was positioned so it was borderline, or at the water level itself, bobbing in and out, the sensor elements in the housing 120 may not be continuously immersed long enough to allow a timer 34 to complete its timing function needed to trigger the inflation mechanism 16. It was determined that locating the housing (s) 120 at the left side and/or right side of the neck near the person's check bone and/or ear helped ensure that the sensor elements would be immersed in liquid water via the chamber (s) of the housing 120 when the person was face down and would be unable to breathe, or fully immersed for longer periods from the force of waves or other reasons, such a swimmer having difficulty getting to or staying above the surface. Such positioning of the housing(s) 120 can also help increase the chances that the housing(s) will be out of the water or near the surface of the water when a user is safely floating on their back or otherwise leaning back in the water.

Below is a table 1 that further illustrates results of testing of different positions for the housings 120 having sensor elements:

| Location of housing 120 with sensor elements | Normal/ More Active Treading | Treading Low in Water | Laying Back In Water | Face Down In Water |
| --- | --- | --- | --- | --- |
| Back of neck, mid height | Goes in and out of water | Stays in water (false positive can occur) | Stays in water (false positive can occur) | Goes in and out of water (false negative can occur) |
| Back of neck, hairline | Mostly out of water | Mostly in water (false positive can occur) | Mostly in water (false positive can occur) | Mostly out of water (false negative can occur) |
| Front of neck, top | ⅔ in: Goes in and out | Stays in water (false positive can occur) | Mostly in water (false positive can occur) | Stays in water |
| Side of neck, mid height | ⅔ in: Goes in and out | Stays in water (false positive can occur) | Stays in water (false positive can occur) | Stays in water |
| Side of neck, high | Mostly out of water | ⅔ in: Goes in and out of water | Goes in and out of water | Stays in water |

Positioning the housing(s) 120 at the left side and/or right side the neck is also able to position the housing(s) out of the way from being obstructed by arms paddling on a surf board, swimming, treading water, or carrying objects on shoulders, etc. by an active person wearing the body 12 of the garment 10 around or in a body of water.

A secondary preferred feature provided by the positioning of the housing(s) and also the size of the housing(s) 120 is that it can be relatively non-descript, e.g. somewhat or entirely hidden from view to provide a desired aesthetic effect. This can be further achieved by coloring the housing 120 to be a particular opaque color such as a black color that may match against a black color fabric body 12 of the garment 10 or a white body 12 of the garment that is matched with the housing 120 being made of a white plastic that matches the white color of the body 12 of the garment 10. Such a visual effect of at least partially hiding the housing(s) 120 or reducing their visibility can be provided by the housing(s) being made of a clear plastic.

This preferred desired aesthetic effect can also be facilitated by structural configuration of the housing 120 that permits the fastening of the housing 120 to the body of the garment 10 to be hidden, covered, or otherwise hard to see (e.g. use of the opening 120g for sewing or looping a portion of the body therefore, use of a flange element for use in fastening, etc.)

The activation mechanism 20 can be connected to a control device 190 that includes a timer 32. The control device 190 can also be connected to the inflation mechanism 16 so that upon a detection of a dangerous submergence condition that is at or exceeds a threshold time period, the inflation mechanism can be triggered. The control device 190 can include at least one printed circuit board (PCB) that includes other hardware such as non-transitory memory connected to a processor and interfaces for connecting the control device 190 to the inflation mechanism 16, first and second sensor elements 121, 122 of the housing 120 via lead lines 36, and a power source 30 for receipt of electricity from the power source to power operation of the control device 190 and its communications with and use of the sensor elements via lead lines 36 within an insulated conduit 36a and the inflation mechanism 16 for actuation of the inflation mechanism 16.

Example of embodiments of the control device 190 can be appreciated from FIGS. 28-31. The control device 190 can include a housing that is water tight. The housing may include a moveable lid that can be opened and closed to provide access to the PCB and other hardware of the control device 190 when the lid is opened while keeping the interior of the housing sealed in a water tight fashion when the lid is closed.

The memory of the control device 190 can have at least one application stored thereon that is executed by a processor of the PCB. The application can define a method by which the control device uses a resistance measurement from the first and second sensor elements 121, 122 obtained via lead lines 36 and the difference in resistance that can be measured by comparing the resistance of a chamber of housing 120 filled with air as compared to being filled with liquid water or liquid salt water to detect a submergence condition that starts use of a timer to determine whether the submergence condition has remained continuously in existence for a pre-selected period of time. If that continuous submergence condition is detected, the control device 190 can communicate with the inflation mechanism 16 to actuate inflation of inflatable chambers 14 so the body 12 of the water garment has an improved buoyancy that will result in the person wearing the garment 10 to be brought to the top of the body water that person is in and avoid drowning.

To help avoid a false positive detection, the control device can be configured via the application stored in the memory attached to the processor and/or PCB so that the control device 190 dynamically updates a resistance threshold that is used to determine whether the chamber(s) (42, 102e, 102f, etc.) is/are submerged or dry. Once the control device 190 detects resistance below an initial first threshold (e.g. initial submersion) it can use those values to set a new second threshold (e.g. a threshold that is lower or higher than the first threshold). There can be a continuously updated moving average for the second resistance threshold, an average set in the beginning after an initial submersion is detected that is then kept for the remainder of the session, or the control device 190 can reference the minimum resistance detected (which should be a value indicating submergence). The second threshold and/or the first threshold can be a predetermined percentage or multiple above the average or minimum value that would give some safety factor to allow for small fluctuations but would not be so high as to mistake a small path of droplets or light wetness remaining within a drained chamber for submersion.

It should be appreciated that after an initial submergence condition is detected, the timer 32 is started by the control device. Upon the submergence condition being present throughout a duration of the timer 32 counting to a pre-selected time period, the control device 190 can be configured to determine that the submergence condition is dangerous and therefore sends a signal to the inflation mechanism 16 to actuate inflation. Upon the submergence condition being determined to no longer be present before the timer 32 reaches the pre-selected time period, the control device 190 may determine that condition was not dangerous and reset the timer 32 to 0 seconds for a subsequent use.

In some embodiments, the control device 190 can also be connected to a user interface 220, which can be configured as a control device having buttons 220a and/or other input mechanisms (e.g. waterproof touch screen display, key pad, etc.). The user interface can also include a vibration mechanism or other output device that can be triggered to emit a vibration and/or sound to the person wearing the body 12 of the garment 10 to indicate that the control device 190 has detected a submergence condition. This output can occur while the timer is actuated and is counting to the pre-selected threshold. The output device can output the signal to the person so that the person can manually reset the timer by use of a button 220a to indicate that the person is not in danger. This can permit the person to avoid an undesired inflation event that may occur due to a false positive detection by the control device 190.

The control device 190 can be configured so that the pre-determined time period for the timer 32 is stored in memory of the PCB. The timer may then count down or count up to that pre-selected time period that is stored in the memory of the PCB. The control device 190 can be configured so that the time period that is storable in the memory may be changed within an allowable range of options via user input that selected one of many different options (e.g. 20 seconds, 30 seconds, 40 seconds, 45 seconds, 1 minute, 2 minutes, 5 minutes, etc.) or may permit input to be provided to select any time period within an allowable range (e.g. 10 seconds to 5 minutes or 15 seconds to 6 minutes, a time that is less than 6 minutes and more than 5 seconds etc.). In some embodiments, the control device 190 can be configured to prevent a time period setting for the timer that is above a time period that is representative of being too dangerous (e.g. a time period that is over 6 minutes or a time period that is over 7 minutes). The control device 190 can also be configured to require entry of a password or other authorization validation input for changing of the pre-selected time period of the timer 32 to avoid unintentional changing of this time period and/or prevent a small child from changing the timer setting to a setting a parent or guardian may view as unsafe.

In response to the button 220a being pressed while the timer 32 is counting to the threshold and the output device has emitted its warning, the timer 32 can be reset by the control device. The timer 32 may then be restarted immediately if the submergence condition is still detected or the timer can be paused for a paused period of time before counting if the submergence condition is still detected after the person has pressed the button 220a to indicate he or she is not in danger and does not want the inflation mechanism 16 actuated. Each time the timer begins counting to the threshold or is within a certain time of reaching the threshold (e.g. a warning time that is within 10 or 15 seconds of the threshold), the control device 190 may actuate the output device to provide an audible and/or tactile warning to the user.

The control device 190 can also be connected to other sensors to receive additional data for use in detecting a submergence condition and/or for adjusting the pre-selected time period for the timer 32 that is to be counted before the inflation mechanism 16 is actuated. Such sensors can include an accelerometer, a pressure sensor, and/or a temperature sensor. Such sensors can be attached to the body 12 of the garment or to the housing 120 and be communicatively connected to the control device via at least one wire, lead line, or other data communication transmission connection.

In some embodiments, the control device 190 can be configured to utilize accelerometer data to adjust the time period for the timer 32 in response to determining that there has been a significant impact (e.g. the accelerometer data indicates a very quick motion of the person that exceeds a pre-selected impact threshold). The control device 190 can also be configured to adjust the timer length based on orientation of the user determined from the accelerometer data. For instance, the control device 190 may shorten the timer 32 time period in response to determining that a person is horizontally positioned within the water or in response to determining that the garment 10 is not moving at a sufficient pace that exceeds pre-selected treading water threshold.

The control device 190 can be configured to utilize pressure sensor data so that the timer is adjusted to account for how deep below the water surface the garment may be. This decrease in time can be used to help account for how long it may take a user to rise to the top of the water in response to inflation. The pressure sensor data can also be used by the control device to determine whether the garment is moving toward the surface or sinking further below the surface for use in evaluating the timer time period and whether it should be increased because the garment is detected as rising toward the surface (e.g. due to decreasing pressure being detected) or decreased because the garment is detected as moving deeper below the surface of the water (e.g. due to increase pressure being detected).

The control device 190 can also be configured to utilize temperature data from a temperature sensor (e.g. thermocouple, thermometer, etc.). For instance, if the temperature is below a temperature threshold, the control device can be configured to shorten the timer time period due to the water being cold.

The control device 190 can also be connected to a location sensor (e.g. a GPS sensor) or obtain location data from a wireless network access point signal to obtain location data. The control device 190 can be configured to utilize the location data to adjust the timer time period. For instance, the control device 190 can be configured to shorten the time period upon determining that the user has moved a distance that exceeds a pre-selected safe zone distance from a particular location (e.g. wireless access point, identified shoreline of a body of water, etc.).

The control device 190 can also be configured to send a signal to an output device so that an audible signal is emitted that can be heard by lifeguards, adults or others nearby at a swimming pool, lake or other swimming area to provide an audible alarm in the event that the inflation mechanism 16 is actuated or is about to be actuated. For example, the output device could be configured to emit a light or flashing light in addition to an audible warning for faster, easier identification of the person wearing the garment 10 who may be in need of help to try and make it easier to locate and aid that person.

The user interface 220 can also be communicatively connected to the control device 190 to permit the user to enter input and/or receive output from the control device 190. For instance, the user interface 220 can be configured to permit a user to press a button 220a to turn the power source 30 on or off so that the control device 190, activation mechanism 20 and inflation mechanism 16 are able to be turned on when the garment 10 is to be used in water and turned off to preserve battery power when it is not to be in use. The user interface 220 can also include at least one output device that can indicate a power level status of the power source 30 to indicate whether batteries should be replaced before further use etc. The user interface can also be utilized for the control device to provide other data to a user (e.g. detected problems with the inflation mechanism or gas source, etc. that may require repair, etc.) that may be detected via a diagnostic function of the control device defined in an application stored in the memory of the control device 190.

For example, the user interface 220 can be configured so that an error or fault light can be illuminated if there is a fault of some sort, such as lack of continuity or a short anywhere in the system, indicating the garment 10 should not be used for water safety until the reason for the fault light being illuminated is resolved.

The user interface 220 can include a button 220a or switch that can be depressed to check system voltage which turns on a variable color LED, indicating green for acceptable voltage, orange or yellow for marginal voltage and red for unacceptable voltage. An activation switch can also be provided in the user interface to activate the inflation mechanism manually via use of an input device to cause electrical actuation of the inflation mechanism 16 (e.g., in the event the user has insufficient strength to pull a manual rip cord connected to trigger 34 for manual activation of the inflation mechanism to fill the inflation chamber 14. A friend or rescue staff assisting the person wearing the water safety device could also utilize this function to activate the inflation mechanism quickly and easily.

The control device 190 can also include a main power switch and a voltage indicator for the different systems: (e.g. batteries for powering trigger 34 and/or batteries for powering control device 190). The control device 190 can also be configured to have a sleep function that can be automatically invoked to preserve battery power for the control device 190 if left on for a period of time without active use, detected by an accelerometer or other means. The main power switch could also be located on the user interface 220.

In some embodiments, the control device 190 can include a circuit configured to shut itself off after a set length of inactivity. Such a control device 190 can also include a "wake-up" circuit connected to the first sensor element 121 and/or the second sensor element 122. When water completes the circuit by continuity through the sensor element(s) via water filling at least one chamber 42, it can result in a signal to the system to power on. That initial wake-up may not be able to sense resistance, but may simply detect the presence of water/wetness/conductivity for fully powering on the control device and inflation mechanism 16. After the control device 190 is fully powered on, it may measure the resistance via a resistance measuring circuit and, upon detection of the resistance being at or below a first threshold, actuate the timer for subsequent actuation of the inflation mechanism 16 as discussed herein.

In some embodiments, the control device 190 can include a transceiver or other wireless communication transceiver to communicate to other elements wirelessly. For instance, the control device 190 can include at least one transceiver or transmitter that can permit the control device 190 to communicate a warning to others who may be nearby to indicate that the inflation mechanism of the garment was activated and that the user of that device may need medical attention. Such a communication may be made so that any electronic device having a Bluetooth transceiver, wireless network transceiver, a radio transceiver, or a near field communication transceiver can receive such a communication.

For instance, the control device 190 can be configured to emit a Bluetooth signal to a smart phone with or without an app, or another wireless signal can be sent from a transmitter to different devices in the vicinity, or paired to a WIFI network, that would communicate to an Alexa or other home-based hub, or the like. This can be particularly applicable for a swimming pool that would have a WIFI network within reach or swimming near a boat that may provide a WIFI network within range of the user wearing the garment 10.

The control device 190 can also include a circuit to engage a GPS satellite using an onboard receiver, produce latitude and longitude coordinates and transmit the control device's position to the coast guard via VHF DSC (Very High Frequency Digital Selective Calling) to the U.S. Coast Guard (USCG). An antenna can be positioned on the body of the garment that is connected to the control device 190 to facilitate such a transmission of data. In some embodiments, the antenna could be positioned to be located on the body 12 of the garment so that, when the garment is worn, the antenna is on the shoulder of the person. The antenna can be configured as a telescoping antenna so that it can be extended by the person to provide for an improved transmission above the water plane. At least one light emitting device can also be attached to the antenna (e.g. a terminal end of the antenna). The light emitting device can be connected to the control device 190 or be otherwise configured so that the light emitting device flashes or otherwise illuminates in a particular pre-selected pattern for greater water-level visibility in response to the control device 190 detecting a dangerous submergence condition.

As another example, when a chain or collection of safety garments 10 or the like are worn by a group of users, they can be configured to communicate among each other via a wireless transceiver of their control devices 190. Peer swimmers could then be notified through a specific vibration of pulses or some particular pattern of pulses, different from a self-vibrator pattern of inflation warning. The peer, friend, parent or lifeguard could then begin looking for someone known to be having problems that may need assistance. Early warnings like this, because time can be very important, may help save people or reduce the risk of more serious problems in water activities.

It is contemplated that the control device 190 can include a location detection mechanism (e.g. a global positioning system element, etc.) and can be used to detect its location and include its location in a transmission indicating that the person wearing the garment 10 may require medical attention as well. This can help others find and help the person wearing the garment 10 in case of an emergency.

The control device 190 can include a circuit configured to check the battery voltage of a power source 30 to make sure there will be enough voltage for a few hours of activity and can also check for continuity in the actuation mechanism of a trigger 34 (e.g. melt wires, power for actuator of trigger 34, etc.). The control device 190 can be configured to send a relatively brief, very low amperage signal to check for continuity and make sure the trigger 34 could be activated. A brief enough and low amperage enough signal would not be enough to actuate the trigger 34 (e.g. melt or otherwise break a cord 71 to move cord into a limp position, actuate motor 84, etc.). This check can be initiated by the user via an input device (e.g. button 220*a* etc.) or done automatically on a periodic basis.

Example inflation mechanisms 16 that can be utilized in embodiments may best be appreciated from FIGS. 4-10 and 18-27. For example, the inflation mechanism 16 can include a gas source 26 that is connected to a trigger 34. The trigger 34 can be connected to the control device 190 so that, in response to a signal or other communication from the control device 190, the trigger can be actuated to open the gas source 26 for inflation of the inflation chamber(s) 14 to which the gas source 26 is connected. The gas source 26 can be connected to an inflation chamber by being positioned in the chamber or by being connected to the inflation chamber 14 via a conduit so that when the gas source is opened, the gas from the gas source 26 is fed into the inflation chamber to inflate the chamber and improve the buoyancy of the body 12 of the garment so that the user can float on top of the water more easily and avoid drowning.

Figure 7:
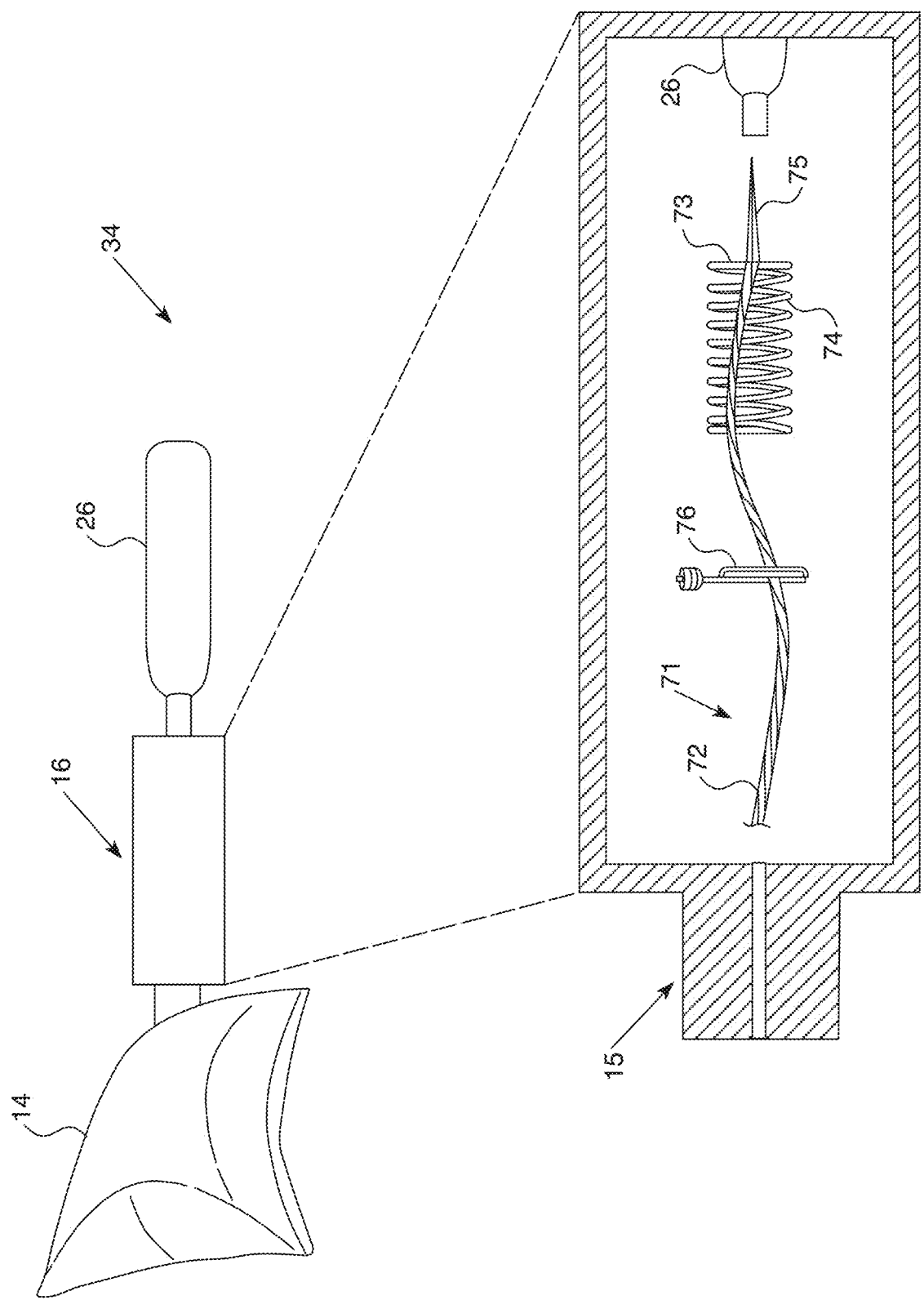
FIG. 7 is a perspective view of an inflation mechanism of a water safety garment, according to an exemplary embodiment of the present invention.
Figure 8:
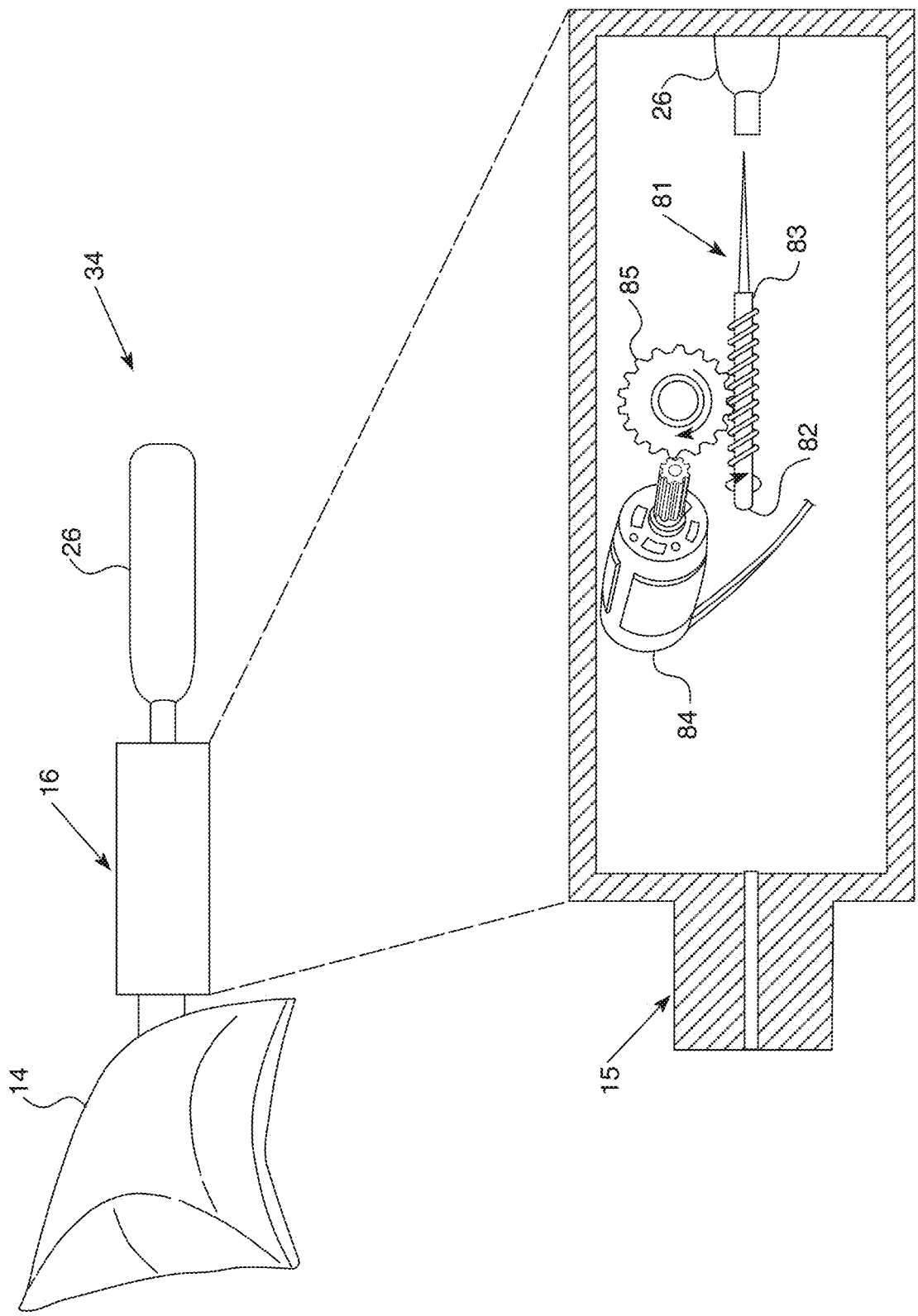
FIG. 8 is a perspective view of an inflation mechanism of a water safety garment, according to an exemplary embodiment of the present invention.

In some embodiments, the trigger 34 may contain a cord 71 including a first end 72 and a second end 73, disposable between a taut position and limp position and a spring 74 disposable between a stored orientation and an extended orientation. While in the taut position, the cord 71 may compress the spring 74 into the stored orientation, as shown in FIG. 7. At least one of the first and second ends 72, 73 of the cord 71 includes a puncture pin 75 designed and configured to puncture the gas source 26 to open the closed gas source 26. When in the taut position, the cord 71 compresses the spring 74 and causes the puncture pin 75 to be disengaged from the gas source 26 to keep the gas source 26 closed, as further shown in FIGS. 7 and 18-20.

The trigger 34 may also include a resistor 76 designed and configured to move the cord 71 between the taut position and the limp position. For instance, the resistor 76 may receive current so that the resistor 76 heats up to burn the cord 71 when the control device 190 determines the user wearing the garment 10 is under water for too long. The burning of the cord provided by the resistor 76 can result in cutting the taut cord so the cord is moved from the taut position to a limp position after it is broken via the burning of the cord 71. In other embodiments, the cord 71 could be cut via a shearing mechanism or other type of cutting device actuated via the trigger 34 and/or control device 190 (e.g. a motor controlled mechanical cutting device configured to cut the cord 71, etc.).

In other embodiments, the trigger 34 can include a carriage 130 that is configured to have a central opening 130*a* so that the body of the carriage 130 can engage an end 150 of a biasing mechanism 140 that includes the spring 74 to prevent the biasing force of the spring 74 to drive a puncture pin 75 into the gas source 26 for opening the gas source for inflation. In some embodiments, the carriage 130 can be configured as a cartridge.

The cord 71 can extend around a periphery of the carriage 130 to keep the cord in a taut position so the carriage is compressed to contact and engage the end 150 of the biasing mechanism 140 that includes spring 74 to prevent extension of the spring 74 (e.g. maintain spring 74 in a compressed position). In response to a signal from the control device 190, the trigger 34 can be actuated so that a resistor 76 attached to the carriage 130 is heated to cut the cord 71 so the cord 71 is broken so it is no longer taut (e.g. is moved to the limp position) so that the carriage 130 extends away from the end 150 and disengages from the end 150 to permit the spring 74 to extend to drive motion of the puncture pin 75 for extending into a valve or pin receiving portion 26*a* of the gas source 26 for opening the gas source for inflation.

To help facilitate the resistor 76 cutting through the cord 71 fully within a desired amount of time (e.g. a short period of time so that inflation is actuated promptly after the trigger 34 receives a signal from the control device, e.g. the resistor receives electrical current via the control device 190), the resistor 76 can be positioned to be lightly sprung into cord 71 or be in contact with cord 71 via the resistor's attachment to the carriage 130. For instance, the resistor 76 can include an opening through which the cord 71 passes so that the resistor can melt the cord 71 from multiple peripheral sides or an entire circumference of the cord 71 so that the resistor 76 can fully cut the cord 71.

Additionally, the cord 71 can be routed about the carriage 130 so that the cord is also wrapped outside of the resistor 76 so that as the carriage 130 hinges upon as the cord is cut by the resistor 76, the cord 71 can be drawn further into the resistor 76. A portion of the resistor 76 can be structured as a cutting wire or other type of cutting device so that as the cord 71 is drawn further into the resistor 76, the resistor cuts the cord 71.

Once the cord 71 is moved into the limp position, the spring 74 is released and extends, which causes the puncture pin 75 to be urged outwardly into the extended orientation in engaging relation with the gas source 26 to open the gas source for inflation of the inflation chamber 14 to which the gas source 26 is connected. For example, the spring 74 biases the puncture pin 75 such that a portion of the puncture pin 75 extends outwardly and engages a portion of the gas source 26 after the cord 71 is moved into its limp position for opening the gas source 26.

Once the puncture pin 75 encounters the gas source 26 and extends therethrough because of the biasing effect of the spring 74, the puncture pin 75 is urged outwardly away from the spring 74 thereby puncturing the gas source 26 and releasing gas into the inflatable chambers 14.

In other embodiments, the trigger 34 can be configured to rotate a carriage 130 to adjust the size of a central opening 130*a* that contacts and engages an end 150 of a biasing mechanism 140. For example, as can be seen from FIGS. 21-22, the trigger can be actuated via a signal from the control device 190 to rotate the carriage to enlarge the central opening 130*a* from a small engagement position to a larger release position to release the biasing mechanism 140 so a spring extends to cause the puncture pin 75 to engage the gas source 26 for inflation of at least one inflatable chamber 14. In some embodiments, a motor connected to the carriage 130 can be configured to drive rotation of the carriage 130 directly or via at least one intermeshed gear or other motor connecting element that connects the motor to the carriage 130. In other embodiments, another type of actuator may be utilized to drive rotation of the carriage to enlarge the opening 130*a* in response to a signal from the control device 190.

As can be appreciated from the embodiments shown in FIGS. 18-22, the trigger 34 can be configured so that a spring 74 can be held in a compressed state by an end 150 of a biasing mechanism 140 engaging a carriage 130 within a central opening 130*a* of the carriage 130. This end 150 of the biasing mechanism 140 can be structured as a cap piece or a stopper piece that engages the carriage 130. The carriage 130 can be structured as a split cylinder or split tube on an angled face. The cord 71 can be wrapped around the outside of the cylinder or tube holding the cylinder or tube of the carriage 130 in a compressed state. A resistor 76 configured to heat up and cut the cord 71 to allow the cylinder or tube body of the carriage 130 to extend out of its compressed state and move outward for releasing the cap or stopper piece and permitting the spring 74 to extend. The split cylinder or tube of the carriage 130 can have at least one hinge about which the parts of the cylinder or tube move when moving between its compressed and extended states. The resistor 76 can be configured to melt the cord 71 to cut the cord 71. The cross-sectional shape of the cylinder or tube of the carriage 130 can be polygonal or other non-circular shape to help facilitate a smooth alignment and engagement/disengagement with the carriage 130 for actuation of the inflation mechanism 16 so the gas source 26 is able to inflate at least one inflatable chamber 14 in response to the control device 190 determining that a dangerous submergence condition exists.

A portion of the resistor 76 can be configured as a cutting wire so that the cord 71 is drawn toward the resistor 76 as the carriage 130 expands via movement about one or more hinges as the cord 71 is melted. As the cord 71 is drawn to the resistor 76, the cord 71 can contact the cutting wire portion of the resistor 76 (or cutting wire attached to the resistor) to facilitate cutting of the cord 71 so that the cord 71 is split and moved fully into its limp position to permit the spring 74 to release for actuating the gas source 26 for inflation of at least one inflatable chamber 14. The drawing in of the cord 71 toward the wire cutting portion of the resistor 76 or cutting device attached to the resistor 76 can be facilitated by the wrapping of the cord about a periphery of the carriage 130 and through an opening defined in the body of the resistor 76.

In another exemplary embodiment, the trigger 34 may include a screw 81 including a first end 82 and a second end 83 disposable between a stored position and an extended position by a motor 84. For instance, the motor 84 may rotate the screw 81 in a first rotational direction so that the screw 81 moves from a retracted position to an extended position when the control device 190 determines the user wearing the garment 10 is under water for too long.

The motor 84 may include a gear 85 (e.g. a worm gear, spur gear, interconnected set of gears, etc.) that aids in moving the screw 81 between the stored position and the extended position. At least one of the first and second ends 82, 83 of the screw 81 includes a puncture pin designed and configured to puncture the gas source 26 when the screw 81 is in the extended position. When in the stored position, the motor 84 causes the puncture pin to be disengaged from the gas source 26 due to the retracted position of the screw 81, as further shown in FIG. 8.

Once the screw 81 is moved into the extended position the puncture pin will move into engaging relation with the gas source 26 to open the gas source. More specifically, a portion of the puncture pin will extend outwardly and engage a portion of the gas source 26. Eventually, the puncture pin encounters the gas source 26 and extends therethrough releasing air into the inflatable chambers 14.

In yet another example, the trigger 34 may include a valve 92 connected to a puncture pin 91 that extends through a gas source 26 when the gas source 26 is engaged with the valve 92. The valve 92 may have an open and closed position whereby the gas source 26 is prevented from releasing air into the inflatable chambers 14 while the valve 92 is in the closed position, and the gas source 26 is allowed to release air into the inflatable chambers 14 while the valve 92 is in the open position. The trigger 34 can include a motor 84 that can be actuated to drive rotation of at least one gear 85 that is connected to the valve 92 such that rotation of the gear(s) 85 driven by the motor causes the valve 92 to be moved between the closed position and the open position.

Figure 9:
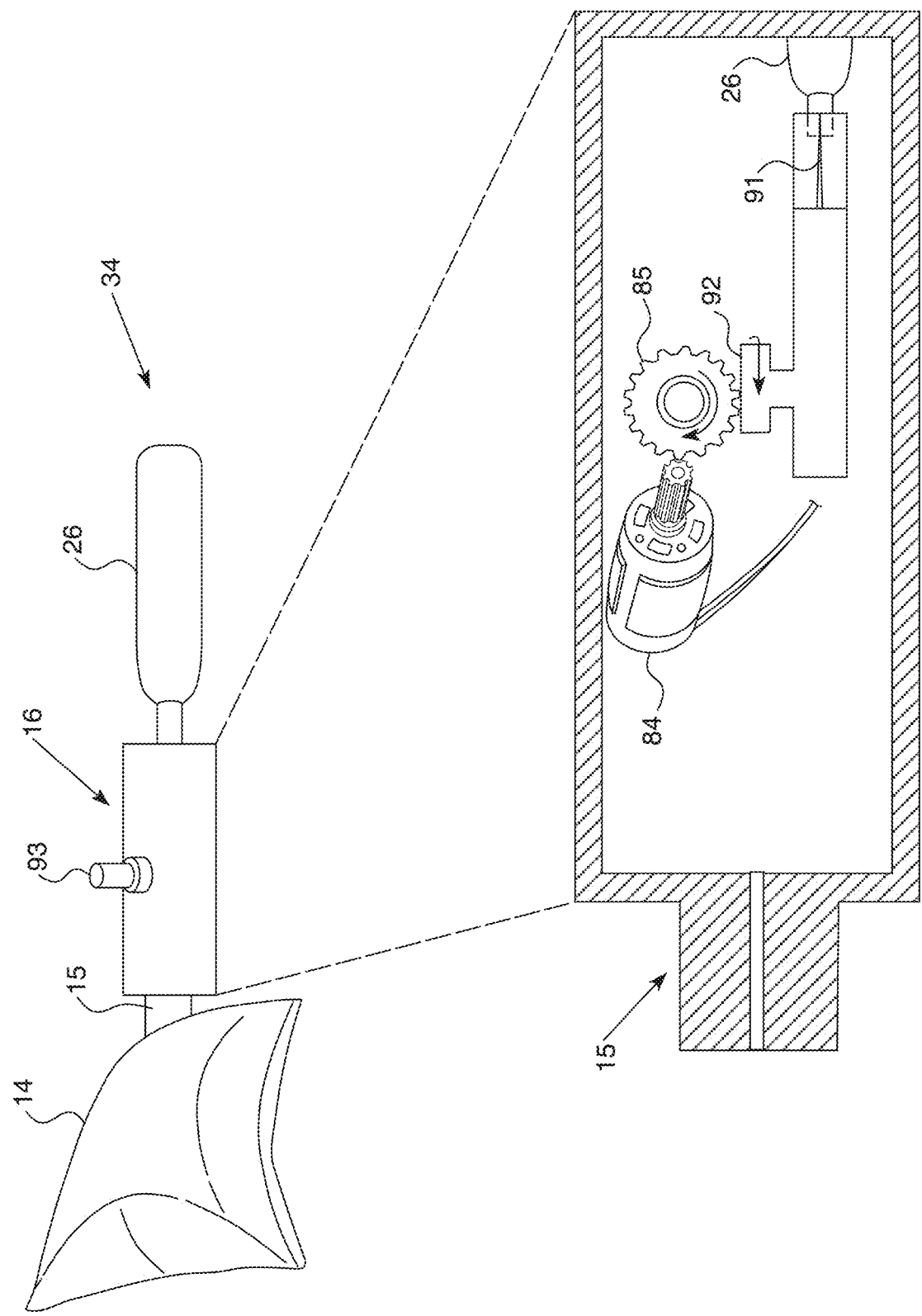
FIG. 9 is a perspective view of an inflation mechanism of a water safety garment, according to an exemplary embodiment of the present invention.

The trigger 34, as depicted in FIG. 9, may also include a pressure pin 93 disposed on its exterior, where the pressure pin 93 would be visible to a user. The pressure pin 93 may have an up and down position, whereby the pressure pin 93 indicates whether the air in an engaged gas source 26 is under sufficient pressure to fill the inflatable chambers 14 if the valve 92 is moved to the open position. A person having skill in the relevant art, after having the benefit of this disclosure, would recognize that a pressure pin 93 may be configured to move into a down position when there is insufficient air pressure in an engaged gas source 26, for example, if the gas source 26 is spent, or if there is a seal leak in the trigger 34.

The trigger 34 can be configured to utilize a motor or other type of actuator that responds to an actuation signal from the control device 190 for opening of at least one gas source 26 for inflation of the inflation chamber(s) 14 incorporated into the body 12 of the garment 10. The trigger 34 can utilize a motor or other type of actuator that drives motion of a sear member 131 to activate the inflation mechanism 16 for inflation of at least one inflation chamber 14.

Figure 23:
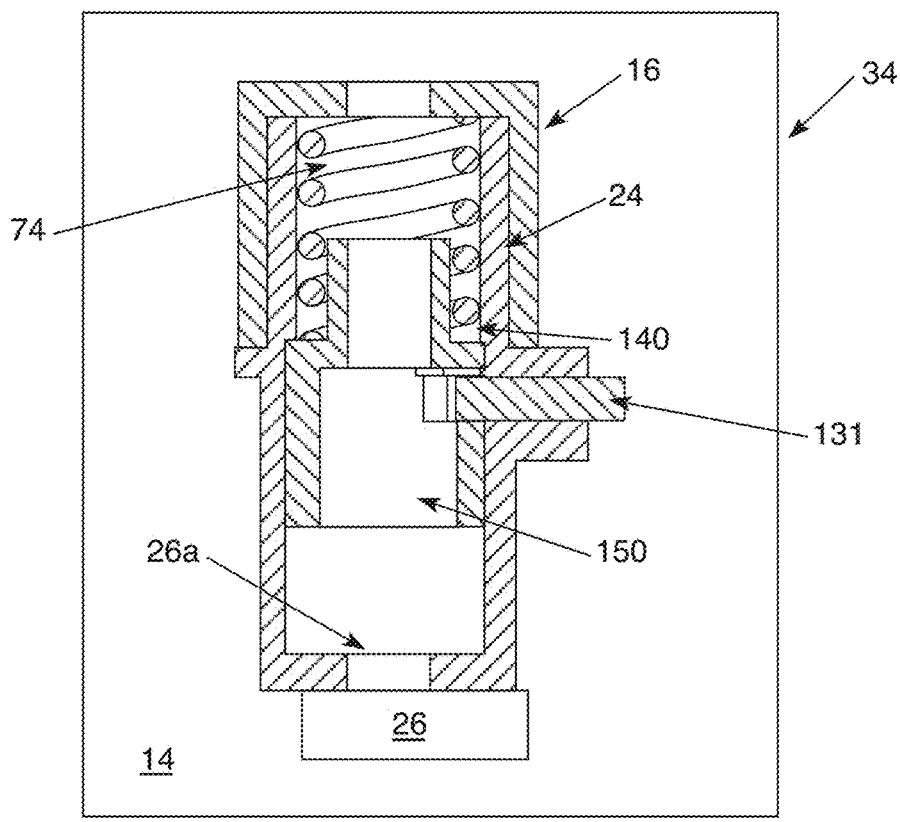
FIG. 23 is a fragmentary perspective view of an exemplary inflation mechanism that illustrates exemplary components of the inflation mechanism that can be utilized to control actuation of the inflation mechanism with the components being shown in a locked state that prevents actuation of the inflation mechanism.
Figure 24:
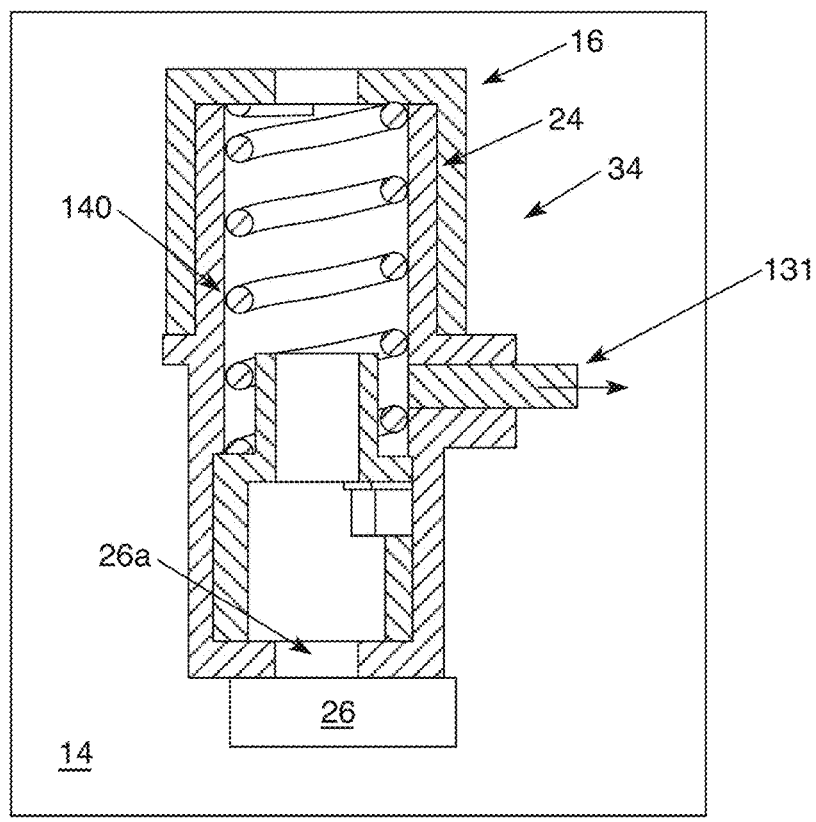
FIG. 24 is a fragmentary perspective view of an exemplary inflation mechanism that illustrates exemplary components of the inflation mechanism that can be utilized to control actuation of the inflation mechanism in a released state that can permit actuation of the inflation mechanism.

For instance, the sear member 131 can be initially in an engaged position at which it is positioned in a sear member hole or other type of profile within an end 150 of the biasing mechanism 140 that includes spring 74 to retain the spring 74 in a compressed position as shown in FIG. 23. The sear member 131 can be moved via actuation of the trigger 34 so that it is moved out of engagement within the end 150 of the biasing mechanism 140 so that the spring 74 is free to extend to drive a puncture pin toward the gas source 26 for opening the gas source 26 for inflation or is free to extend to drive motion of a valve for opening the gas source 26 for inflation of the inflation chamber(s) to which the gas source 26 is connected. FIG. 24 illustrates an example of such a disengagement by a sear member 131.

Figure 25:
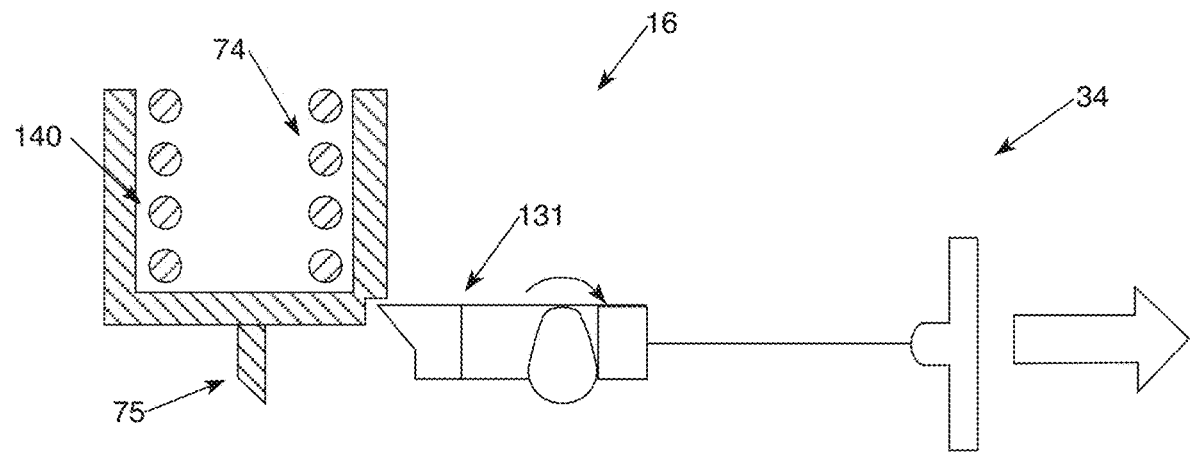
FIG. 25 is a schematic view of an exemplary inflation mechanism illustrating an arrangement of components that can be utilized to control actuation of the inflation mechanism with the components being shown in a locked state that prevents actuation of the inflation mechanism.
Figure 26:
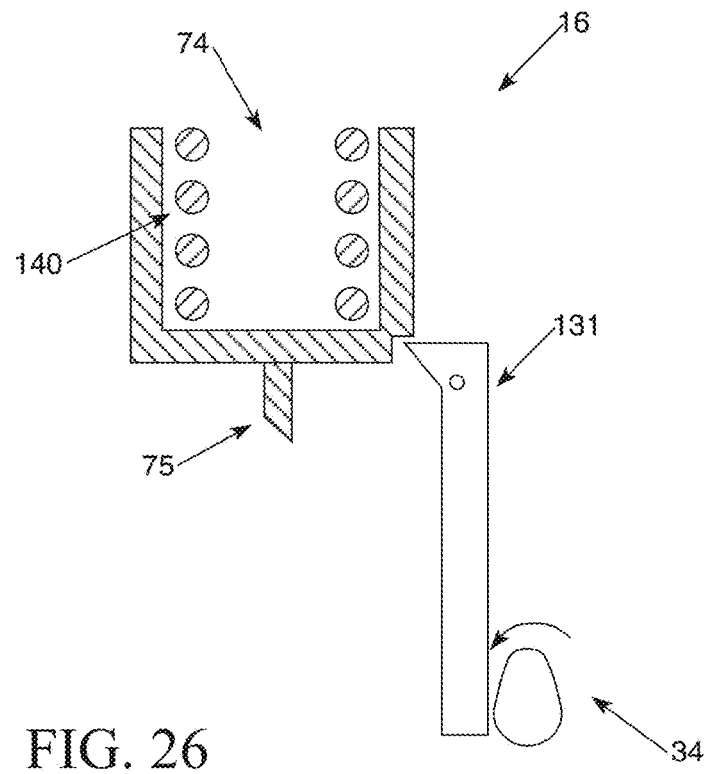
FIG. 26 is a schematic view of an exemplary inflation mechanism illustrating an arrangement of components that can be utilized to control actuation of the inflation mechanism with the components being shown in a locked state that prevents actuation of the inflation mechanism.

As can be appreciated from FIGS. 25 and 26, there are other embodiments that may utilize a sear member 131. For example, an embodiment of the trigger 34 can utilize a motor or other type of actuator (e.g. a gas spring) that can be actuated via a signal from the control device 190 to drive motion of the sear member 131 out of engagement with the biasing mechanism 140 that includes a spring 74 so that the spring is able to be extended from a compressed position to drive opening of at least one gas source 26. The actuation can be via a pulling force driven by a motor or other actuator (e.g. gas spring, other type actuator) that is activated in response to a signal from the control device for activation of the inflation mechanism 16. The sear member 131 can be configured to move linearly to release the biasing mechanism 140 via motion of an activation lever or cam driven by a motor or other actuator that responds to the control signal of the control device 190.

Figure 27:
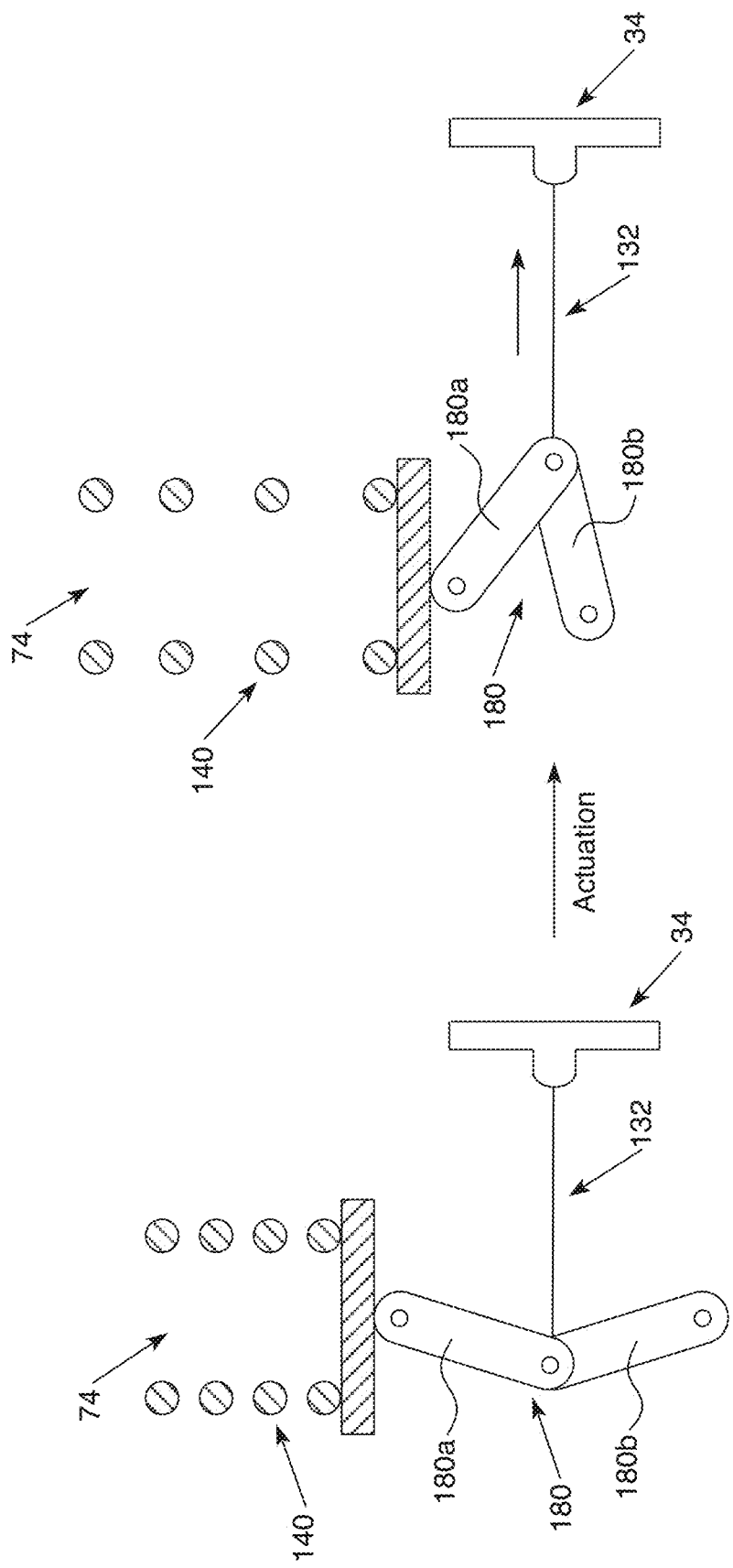
FIG. 27 is a schematic view of an exemplary inflation mechanism illustrating an arrangement of components that can be utilized to control actuation of the inflation mechanism with the components being shown being adjusted from a locked state that prevents actuation of the inflation mechanism to a released state that permits actuation of the inflation mechanism.
Figure 28:
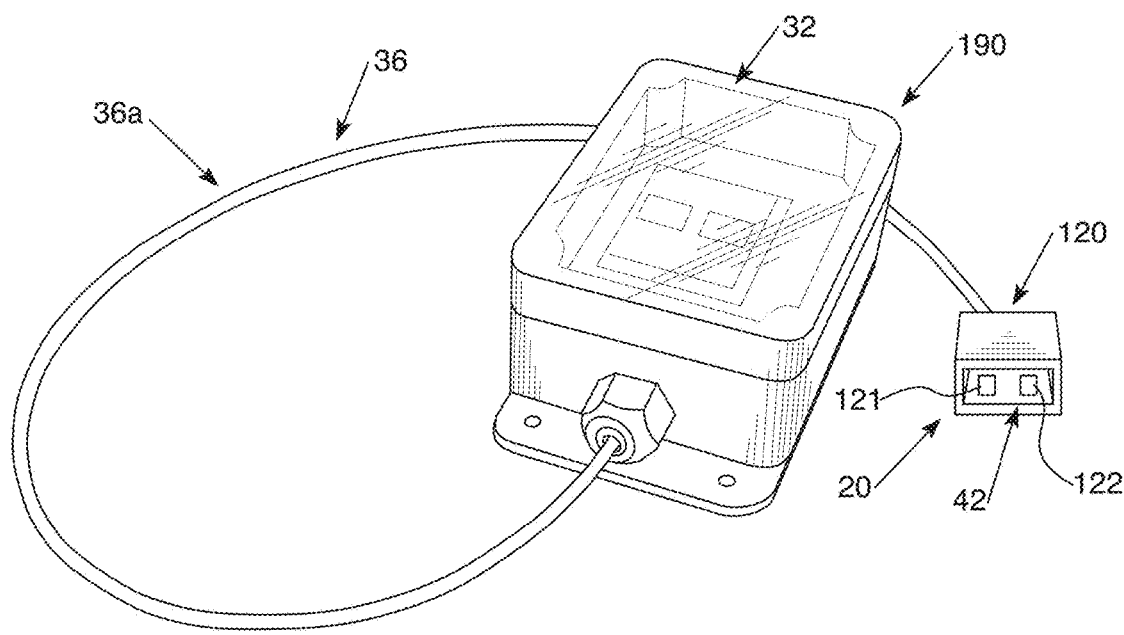
FIG. 28 is a perspective view of an exemplary control device that is communicatively connectable to the activation mechanism and also to the inflation mechanism and is attachable to an embodiment of the water safety garment (e.g. the water safety garment of FIG. 1). The control device can implement an exemplary embodiment of the timing mechanism.
Figure 29:
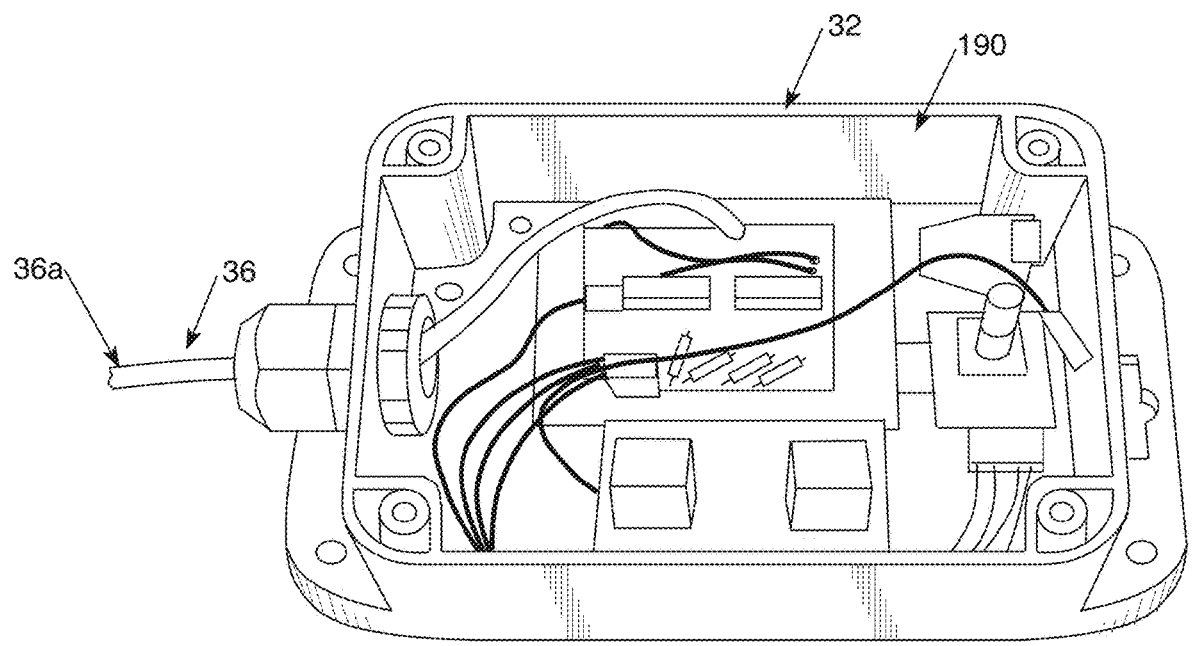
FIG. 29 is a perspective view of the exemplary control device shown in FIG. 28 with a covering removed to better illustrate internal components (e.g. printed circuit board and other hardware elements etc.).
Figure 30:
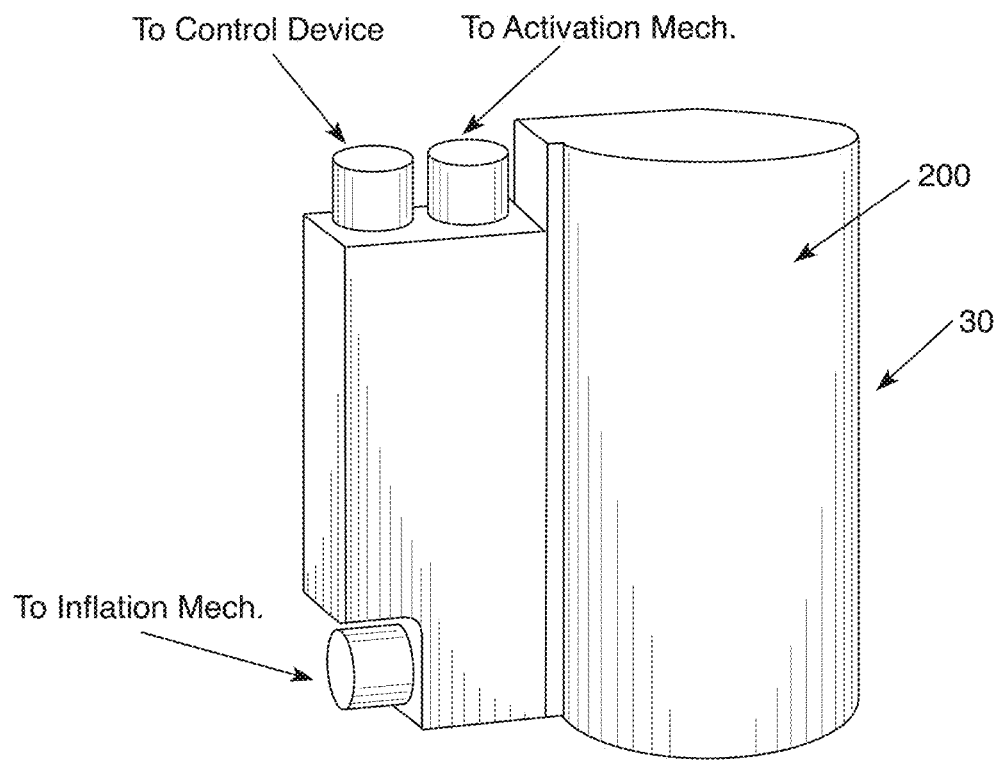
FIG. 30 is a perspective view of an exemplary control device that incorporates a power source therein so that the power source can be connected to the control device, activation mechanism, and inflation mechanism to provide electricity to those elements.
Figure 31:
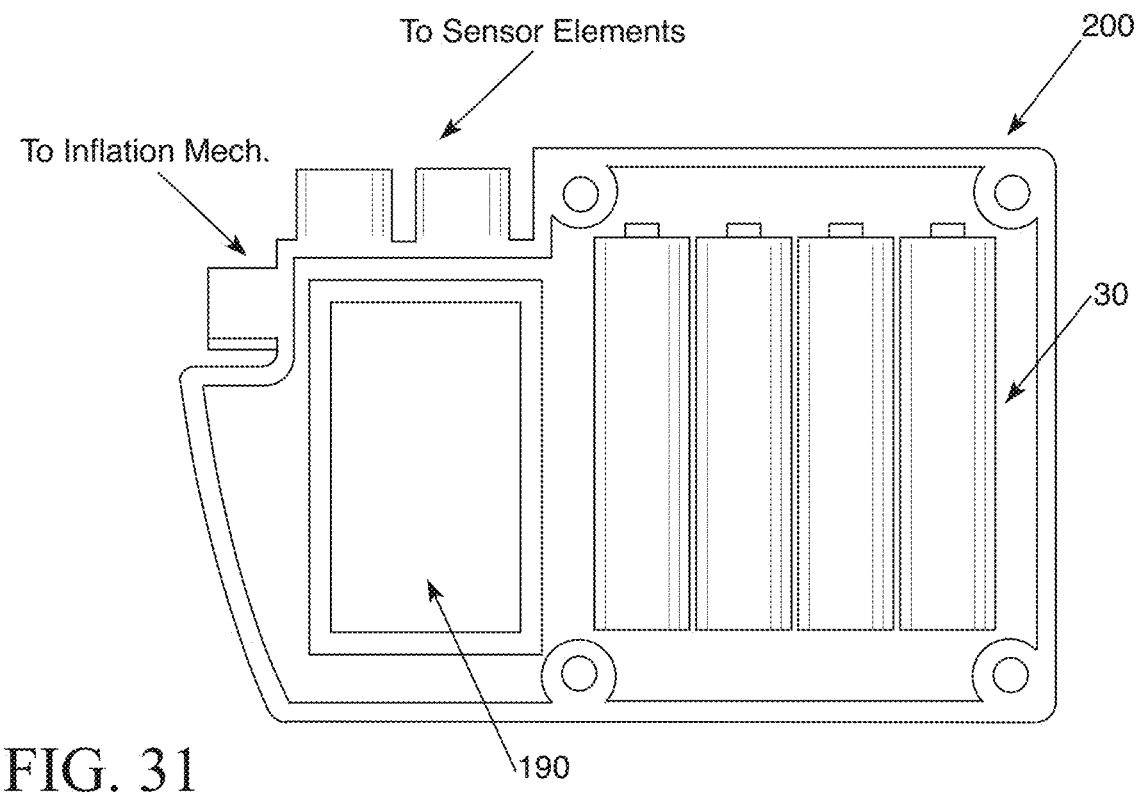
FIG. 31 is a schematic view of another exemplary control device that incorporates a power source therein that can be connected to the control device, activation mechanism, and inflation mechanism to provide electricity to those elements.
Figure 32:
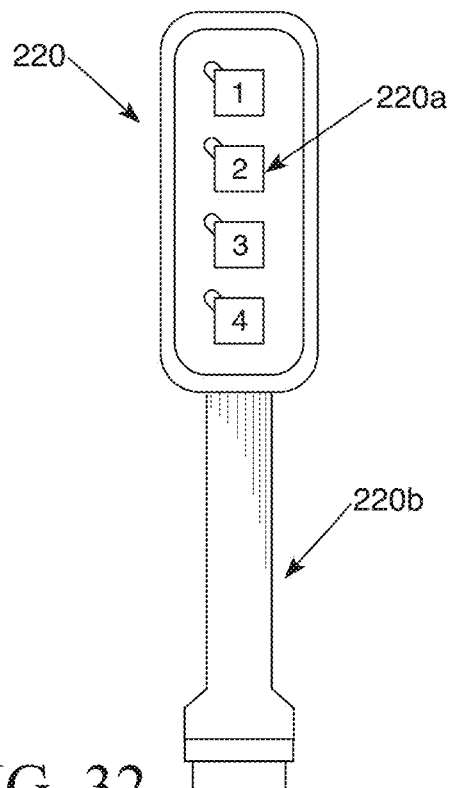
FIG. 32 is a perspective view of an exemplary control interface device that is connectable to the control device and is also attachable to an embodiment of the water safety garment (e.g. the water safety garment of FIG. 1)

In yet other embodiments, the biasing mechanism 140 can be released via a release mechanism 132 that is triggered by a trigger 34 in response to a signal received from the control device 190 (as shown in FIG. 27, for example). Such an embodiment may be configured so that an actuator 132 is moved to cause a leg assembly 180 having a first leg 180a that is pivotally connected to a second leg 180b to move so that the legs pivot relative to each other to permit a spring 74 of the biasing mechanism to extend to open a gas source for inflation of at least one inflation chamber 14. In some embodiments, the actuator 132 can also be configured to respond to a second signal from the control device 190 to cause the legs to move from a retracted position to an extended position to compress the spring 74 of the biasing mechanism 140 to cause the gas source to close and stop inflating an inflation chamber.

Figure 34:
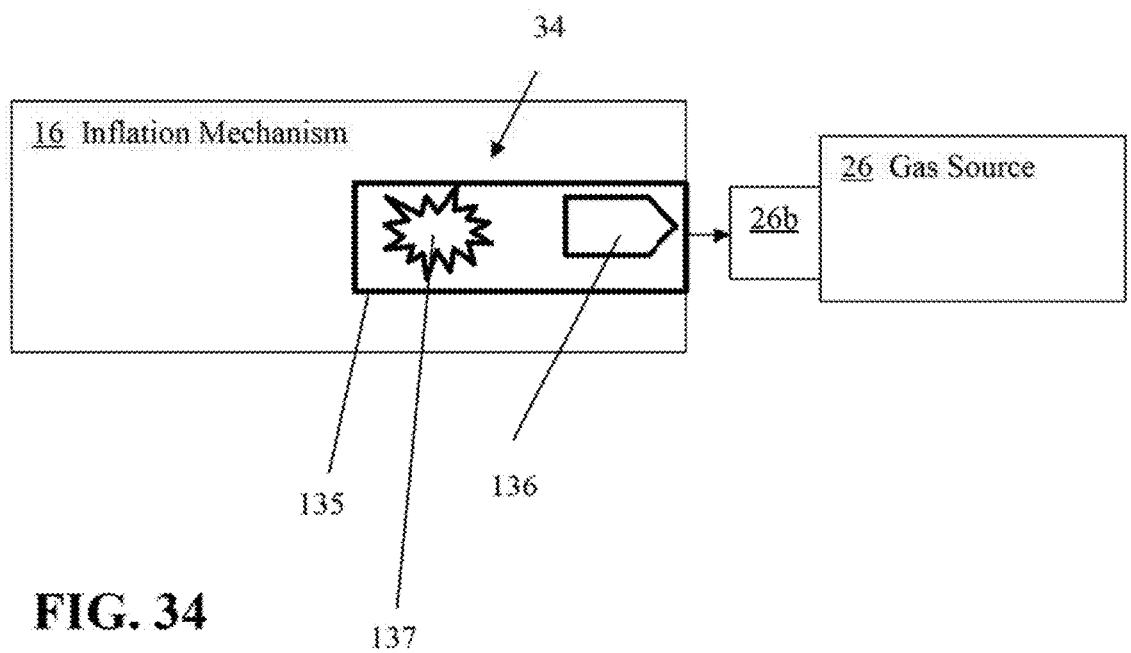
FIG. 34 is a schematic view of an exemplary inflation mechanism illustrating an arrangement of components that can be utilized to control actuation of the inflation mechanism for causing a gas source to inflate at least one inflatable chamber.

In yet other embodiments the trigger 34 of the inflation mechanism that is actuated via a signal from the control device 190 can be an electronic-pyrotechnic firing mechanism. An example of this mechanism is shown in FIG. 34. For instance, the trigger 34 can include a gunpowder cartridge 135 that has a shell casing 136 with no bullet that is actuated via a signal from the control device 190 to ignite the gunpowder to cause a small explosion 137 that drives the shell casing 136 into a shell receiving portion 26b of the gas source 26 that is configured to break open in response to being hit by the shell casing 136 to open the gas source 26 for inflation of the inflation chamber(s) 14.

The power supply 30 can be a module of the control device 190 that is integrated therein or can be a separate device positioned at a different portion of the body 12 of the garment 10. An example of embodiments of the power supply 30 may best be seen from FIGS. 30 and 31. The power supply 30 can include a housing 200 for retaining one or more batteries. The power supply can also include interfaces for providing electrical current providable via the batteries to the control device 190. The power supply 30 can also include interfaces for providing electrical current to the inflation mechanism 16 and activation mechanism 20 (e.g. the first and second sensor elements 121, 122).

Figure 33:
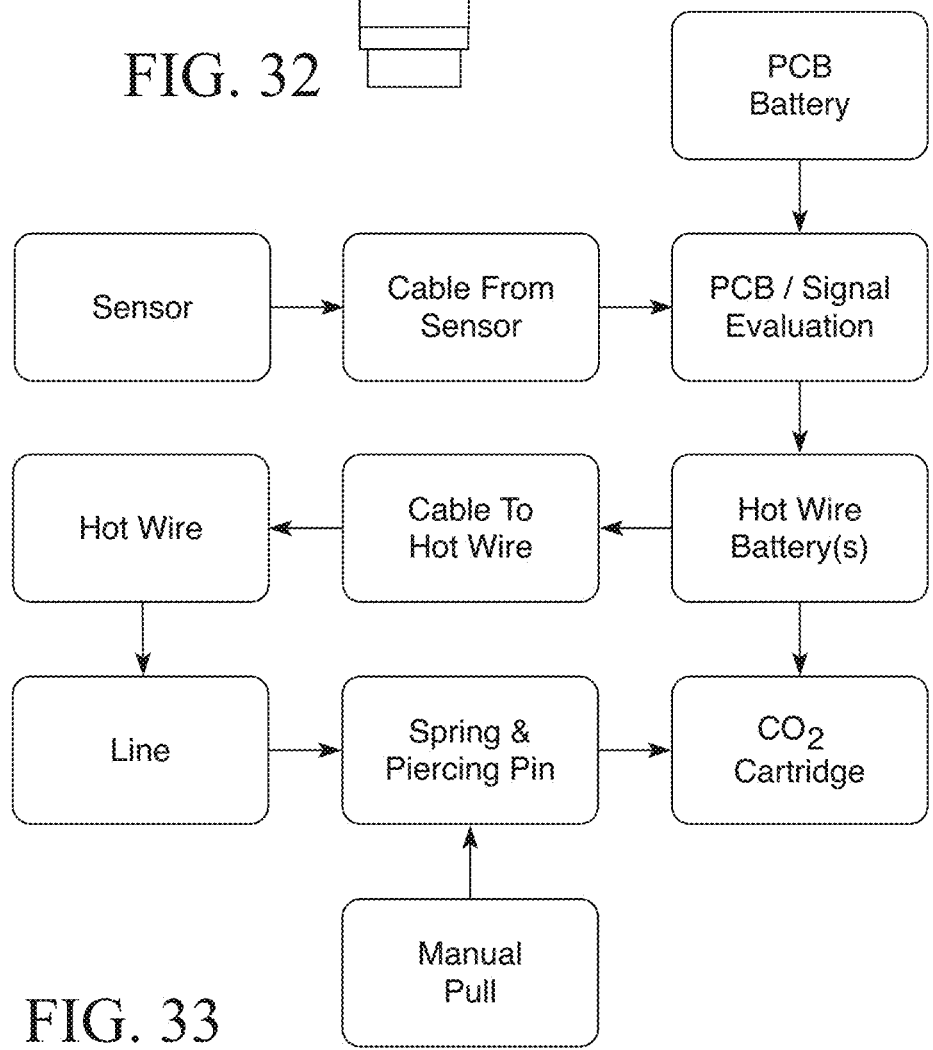
FIG. 33 is an exemplary flow chart illustrating an exemplary process that can be utilized in conjunction with an embodiment of the water safety garment.

FIG. 33 illustrates an exemplary method by which the inflation mechanism 16 can be actuated. The power source 30 (e.g. PCB battery that may provide power for operation of control device 190 and inflation mechanism 16 and submergence detector, etc.) can be turned on and the signal from the sensor elements can be evaluated by the control device. In response to detecting a submerged condition that is present continuously for at least as long as a pre-selected threshold as discussed herein, the control device can send an actuation signal to a trigger 34 for actuation of the biasing mechanism 140 for opening of at least one gas source 26 for inflation of one or more inflatable chambers 14. This can be achieved by melting a cord 71, cutting a cord 71, moving a sear, or otherwise actuating an actuator (e.g. motor, gas spring, etc.) to release a spring 74 of the biasing mechanism 140 or otherwise drive opening of a gas source 26. In some embodiments, the biasing mechanism 140 can also be released via a pull string connected to the gas source such that pulling of the pull spring by a user opens the gas source for inflation of the inflation chamber(s) 14.

In some embodiments, the garment 10 can be configured for repeated inflation uses. For such embodiments, each inflatable chamber 14 can be connected to a pressure release valve to permit gas to be emitted out of the chamber. The gas sources 26 can also be replaced in such embodiments to facilitate repeated use of the garments for multiple inflations of the inflation chamber(s) 14.

A water safety garment and apparatus configured to avoid drowning as described herein can advantageously be designed to operate automatically to help prevent drowning while still allowing a wearer of the garment 10 to more fully enjoy and interact with the water. By delaying inflation for a predetermined time period after submergence via the activation mechanism 20 and control device 190, a wearer can repeatedly dive and swim completely or partially underwater without undesirably inflating the garment.

It should be understood that the foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described.

For instance, it should be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Therefore, while certain exemplary embodiments of water safety garments, apparatuses configured to avoid drowning, and methods of making and using the same have been shown and described above, it is to be distinctly understood that the invention is not limited thereto but may be otherwise variously embodied and practiced within the scope of the following claims.

What is claimed is:

1. A water garment comprising:
   a body;
   at least one inflatable chamber attached to the body;
   at least one inflation mechanism connected to the at least one inflatable chamber for inflation of the at least one inflatable chamber;
   at least one sensor element positioned to detect at least a part of a head of a user wearing the body being submerged under water, the at least one sensor element comprising a first sensor element,
   a housing attached to the body, the housing having a first chamber, the first chamber being configured so that the first chamber is fillable with liquid water when submerged under water and liquid water is drainable out of the first chamber to drain the first chamber when not submerged under water, the first sensor element positioned at least partially within the first chamber to detect a presence of liquid water within the first chamber; and
   a control device connected to the at least one sensor element and the inflation mechanism such that detection of liquid water within the first chamber continuously for a pre-selected period of time is detectable, the control device configured to actuate the inflation mechanism to inflate the at least one inflatable chamber in response to determining that the liquid water was within the first chamber continuously for the pre-selected period of time;
   wherein the control device has a timer that is actuated when a resistance to electrical current or voltage obtained via the at least one sensor element is determined to have decreased to a first pre-selected threshold via liquid water passing into the first chamber, the timer configured to count to the pre-selected period of time in response to actuation of the timer; and
   wherein the control device is configured to reset the timer upon determining that the resistance increased to a value that is above the first pre-selected threshold due to draining of the liquid water and the liquid water being replaced with air within the first chamber.

2. The water garment of claim 1, wherein the first chamber extends vertically and the first sensor element is a metallic rod or pin that extends in a direction that is transverse to the first chamber.

3. The water garment of claim 1, wherein the control device comprises a printed circuit board (PCB).

4. The water garment of claim 1, wherein the control device is configured to adjust the first pre-selected threshold to a second pre-selected threshold value after the timer is actuated, the control device configured to reset the timer upon determining that the resistance increased to a value that is above the second pre-selected threshold.

5. The water garment of claim 1, comprising an output device connected to the control device and an input device connected to the control device, the control device configured to actuate the output device to emit at least one warning to indicate inflation of the inflation mechanism will occur at a future time unless input is provided via the input device to reset the timer.

6. The water garment of claim 1, wherein the control device is configured to transmit an emergency signal for wireless communication after actuation of the inflation mechanism.

7. The water garment of claim 1, wherein the body is configured as a vest or shirt.

8. The water garment of claim 1, wherein the housing has a plurality of holes in communication with the first chamber so that liquid water is passable into the first chamber when the housing is submerged under water and the liquid water is drainable from the first chamber when the housing is out of the water.

9. The water garment of claim 1, wherein the housing includes a wall dividing the first chamber from a second chamber, the first sensor element positioned in a first sensor element opening of the housing to position the first sensor element at least partially within the first chamber to detect a presence of liquid water within the first chamber.

10. The water garment of claim 1, wherein the inflation mechanism comprises a gas source connected to a trigger, the trigger connected to the control device.

11. A water safety apparatus comprising:
at least one inflatable chamber attachable to a body of a water garment;
at least one inflation mechanism connected to the at least one inflatable chamber for inflation of the at least one inflatable chamber;
at least one sensor element comprising a first sensor element,
a housing attachable to the body of the water garment, the housing having a first chamber, the first sensor element positioned at least partially within the first chamber to detect a presence of liquid water within the first chamber, the housing having at least one hole in communication with the first chamber so that liquid water is passable into the first chamber when the housing is submerged under water and the liquid water is drainable from the first chamber when the housing is out of the water
a control device connected to the at least one sensor element and the inflation mechanism, the control device configured to actuate the inflation mechanism to inflate the at least one inflatable chamber in response to determining that the first sensor element detected a presence of liquid water within the first chamber continuously for a pre-selected period of time;
wherein the control device has a timer that is actuated when a resistance to electrical current or voltage obtained via the at least one sensor element is determined to have decreased to a first pre-selected threshold via liquid water passing into the first chamber, the timer configured to count to the pre-selected period of time in response to actuation of the timer; and
wherein the control device is configured to reset the timer upon determining that the resistance increased to a value that is above the first pre-selected threshold due to draining of the liquid water and the liquid water being replaced with air within the first chamber.

12. The apparatus of claim 11, wherein the inflation mechanism comprises a gas source connected to a trigger, the trigger connected to the control device.

13. The apparatus of claim 11, wherein the housing includes a wall dividing the first chamber from a second chamber, the first sensor element positioned in a first sensor element opening of the housing to position the first sensor element at least partially within the first chamber to detect a presence of liquid water within the first chamber.

14. The apparatus of claim 11,
wherein the control device is configured to adjust the first pre-selected threshold to a second pre-selected threshold value after the timer is actuated, the control device configured to reset the timer upon determining that the resistance increased to a value that is above the second pre-selected threshold.

15. A method of inflating a water garment, comprising:
wearing a body of the water garment in the water, the water garment also comprising:
at least one inflatable chamber attached to the body;
at least one inflation mechanism connected to the at least one inflatable chamber for inflation of the at least one inflatable chamber;
at least one sensor element, the at least one sensor element comprising a first sensor element;
a housing attached to the body of the water garment, the housing having a first chamber, the first sensor element positioned at least partially within the first chamber to detect a presence of liquid water within the first chamber, the housing structured such that liquid water is passable into the first chamber when the housing is submerged under water and liquid water is drainable out of the first chamber when the housing is out of the water;
a control device connected to the at least one sensor element and the inflation mechanism, the control device configured to detect submergence of at least a part of the head of the user wearing the body continuously for a pre-selected period of time in response to determining that the first sensor element detected a presence of liquid water within the first chamber continuously for the pre-selected period of time;
the control device actuating a timer when a resistance to electrical current or voltage obtained via the at least one sensor element is determined to have decreased to a first pre-selected threshold via liquid water passing into the first chamber, the timer configured to count to a pre-selected period of time in response to actuation of the timer; and
the control device resetting the timer upon determining that the resistance increased to a value that is above the first pre-selected threshold due to draining of the liquid water and the liquid water being replaced with air within the first chamber;

the control device detecting submergence of the at least the part of the head of the user wearing the body continuously for a pre-selected period of time via the at least one sensor element detecting liquid water within the first chamber continuously for the pre-selected period of time while the first chamber is filled with water; and the control device actuating the inflation mechanism for inflation of the at least one inflatable chamber in response to the detecting of the submergence of the at least the part of the head of the user.

16. The method of claim 15, comprising:

the control device adjusting the first pre-selected threshold to a second pre-selected threshold value after the timer is actuated; and the control device resetting the timer upon determining that the resistance increased to a value that is above the second pre-selected threshold.

17. The method of claim 15, comprising:

emitting at least one warning to indicate inflation of the inflation mechanism will occur at a future time unless input is provided via an input device to reset the timer.

18. The method of claim 15, comprising:

transmitting an emergency signal for wireless communication after actuation of the inflation mechanism.

* * * * *